US007360151B1

(12) United States Patent
Froloff

(10) Patent No.: US 7,360,151 B1
(45) Date of Patent: Apr. 15, 2008

(54) SYSTEM AND METHOD FOR CREATING CUSTOM SPECIFIC TEXT AND EMOTIVE CONTENT MESSAGE RESPONSE TEMPLATES FOR TEXTUAL COMMUNICATIONS

(76) Inventor: Walt Froloff, 273D Searidge Rd., Aptos, CA (US) 95003

( * ) Notice: Subject to any disclaimer, the term of this patent is extended or adjusted under 35 U.S.C. 154(b) by 935 days.

(21) Appl. No.: 10/445,758

(22) Filed: May 27, 2003

(51) Int. Cl.
*G06F 17/00* (2006.01)
(52) U.S. Cl. ...................... 715/255; 715/256
(58) Field of Classification Search ............... 715/500, 715/530
See application file for complete search history.

(56) References Cited

U.S. PATENT DOCUMENTS

| | | | | |
|---|---|---|---|---|
| 4,931,934 | A * | 6/1990 | Snyder | 434/236 |
| 5,165,018 | A * | 11/1992 | Simor | 709/222 |
| 5,559,927 | A * | 9/1996 | Clynes | 704/258 |
| 6,075,193 | A * | 6/2000 | Aoki et al. | 84/609 |
| 6,385,581 | B1 * | 5/2002 | Stephenson | 704/270 |
| 6,433,784 | B1 * | 8/2002 | Merrick et al. | 345/473 |
| 6,553,373 | B2 * | 4/2003 | Boguraev et al. | 707/5 |
| 6,990,452 | B1 * | 1/2006 | Ostermann et al. | 704/260 |
| 7,055,099 | B2 * | 5/2006 | Nakagawa | 715/530 |
| 7,249,312 | B2 * | 7/2007 | Jasper et al. | 715/500 |
| 2001/0037720 | A1 * | 11/2001 | Funaki | 84/478 |
| 2002/0187829 | A1 * | 12/2002 | Hasegawa | 463/29 |
| 2002/0193996 | A1 * | 12/2002 | Squibbs et al. | 704/260 |
| 2002/0198717 | A1 * | 12/2002 | Oudeyer et al. | 704/270 |
| 2003/0033312 | A1 * | 2/2003 | Koizumi et al. | 707/100 |
| 2003/0182123 | A1 * | 9/2003 | Mitsuyoshi | 704/270 |
| 2004/0032624 | A1 * | 2/2004 | Stevens et al. | 358/402 |
| 2004/0054534 | A1 * | 3/2004 | Junqua | 704/258 |
| 2004/0123724 | A1 * | 7/2004 | Funaki | 84/478 |
| 2005/0131673 | A1 * | 6/2005 | Koizumi et al. | 704/2 |
| 2007/0162283 | A1 * | 7/2007 | Petrushin | 704/255 |

OTHER PUBLICATIONS

Krema et al., Themometers and Themostats : Characterizing and Controlling Thematic Attributes of Information, ACM 2002, pp. 196197.*
Tosa et al., <<Interactive Poem System >>, ACM 1998, pp. 115-118.*
Nakatsu et a., Emotion Recognition and Its Application to Computer Agents with Spontaneous Interactive Capabilities, ACM 1999, pp. 135-143.*

* cited by examiner

*Primary Examiner*—Cong-Lac Huynh
(74) *Attorney, Agent, or Firm*—Walt Froloff

(57) ABSTRACT

Aspects of the invention present a system and methods to analyze textual communications, which include cognitive as well as emotive content. Generally accepted communication models and principles are used to create communication unique response templates which responders can use to complete a comprehensive, thoughtful, emotively validating response message. An embodiment is comprised of parsing and tokenizing the textual communication into the parts of speech, selecting subject matter from the tokenized parts of speech, fetching starter sentence string fragments from pre-stored data structures, concatenating the fragment strings with selected subject matter or emotive content into grammatical response sentence fragment strings, opening a response file or output device into which synthesized starter response sentence string fragments are written, such that the application systematically processes the complete textual communication and synthesizes communication unique response templates populated with response sentence string fragments in accordance with effective communication principles.

11 Claims, 10 Drawing Sheets

Dear Jim,

I know that you've heard me talk about our Saturday Evening Book Club and how much I enjoy it. We're a small group, we like it that way, and so the opportunity to invite a new member does not come up often. I'm happy to tell you that we have room for a new member, and I cannot think of anyone who would enjoy membership more than you, an avid reader, a great conversationalist, and someone who enjoys the company of kind and interesting people. So, you and the Book Club seem to me, beyond question, a natural fit.

Jim, please consider this letter a formal invitation to our next meeting, Saturday evening, the 6$^{th}$, at 7:00. We meet at one another's homes, on a rotating basis. This Saturday, the meeting is at Jen Christiansen's house, 666 Cyper Lane. If you like, you can come over to my house first, about 6:00, and we can go to Jen's house together. The book we're discussing is How to Say It From the Heart by Jack Griffin, but you don't have to read it prior to the meeting. The idea is just to sit in and see how you like the group.

Please give me a call by Tuesday evening to let me know if you would like to attend or if you have any questions. It would be wonderful to have you as a member.

Yours truly,

Walt

FIG. 7

Dear Walt,

You wrote me about [Saturday Evening Book Club, small group, way, opportunity, new member]

It seems that you [enjoy, like, are happy] regarding [Saturday Evening Book Club]

Concerning [Jim, letter, formal invitation, next meeting]

When you say you_[like] [letter, invitation, Saturday]

I can appreciate that [call, Tuesday evening] is on your mind and

Looks as if you feel [wonderful] about [Tuesday evening, member]

Best regards,
Jim

FIG. 8

910
Sender: I intend to get back at  Jim for this incident
920
 I know where you eat lunch and I know what you eat
          
930
I know where you eat lunch and I know what you eat
   
FIG. 9

SYSTEM AND METHOD FOR CREATING CUSTOM SPECIFIC TEXT AND EMOTIVE CONTENT MESSAGE RESPONSE TEMPLATES FOR TEXTUAL COMMUNICATIONS

RELATED APPLICATION

This application references a previous filed application in the same field of invention; Ser. No. 09/563,624 filed May 2, 2000, entitled "System and Method for the Embedment of Emotive Content Into Modern Text Processing, Publishing and Communication."

BACKGROUND OF THE INVENTION

1. Field of the Invention

The present invention relates to the field of textual communication. More particularly, the present invention relates to programmable methods of parsing electronic communication containing textual and emotive content and building message unique response templates to these communications, which are thoughtful, appropriate, comprehensive, and message unique.

2. Background

While it is known that users respond emotionally to their computers, more importantly, it has always been known the users communicate and respond to other users through various degrees and levels of social interaction based on emotional communication. The emotional communication layer is what has been difficult to decipher and encode and few tools are available for users to adequately manage their communications in this vital layer of communication.

Letters, office memos, personal email, and other writings requiring a response are all occasions to answer a textual communication. A large and growing burden of our communication occurs through written textual communication. A significant portion of that is for the purposes of establishing and or maintaining relationships. Unintended ambiguity, either embedded by the sender or perceived by the reader, in textual communication can lead to misinterpretation, which can deteriorate any established or newly formed relationship. What is an ounce of prevention worth? Proper responses in communication can consolidate understanding, solidify nourish and invigorate relationships, many of which are supported by textual communication.

Inappropriate responses to textual communications may at best maintain the status quo and at worst lead to deterioration of the relationship. Counseling and therapeutic methods are currently available for the resolution and rejuvenation of weakened relationships. These methods and techniques offer several approaches to "healthy" communication, which can be adapted to electronic textual communication. However these have physical and logistical obstacles, which often require a therapist or mediator physically present to facilitate or mediate the communication because the emotive perception and response are to a large degree ignored in modern communication and textually very difficult to embed, decipher and respond to.

Deep breathing and visualization techniques can help but responding in the optimal way may also require research and practice most people are not willing to invest in a timely beneficial response. What is needed are methods of dealing with and responding to issues and emotive emissions in textual communication between parties in ways which promote and cultivate healthy personal, business and other relationships. Programmable or automated tools, which will instantly and systematically parse a textual message, with or without emotive content, and fashion a guideline response are needed.

Available Resources

Modern email programs, word processors, publishing software and other device-to-device communication offer electronic tools to allow the receiver to respond to textual communication in customizable presentations and formats. E-tools and application features include wizards and templates to deliver textual output in different and appropriate formats and styles. Templates are based on generally accepted business, formal, chatty and personal styles. Styles, standards, placement, punctuation, thesaurus, spelling and grammar checking tools are mostly aimed at aiding the user to deliver presentable, not embarrassing, textual responses. Spell checkers and grammar checkers are very useful but they have their own limitations as well. For example these tools cannot handle homonym errors and organization. These require human intervention for anything more than mere style and format issues. Small word substitution mistakes altering sentence meaning and purpose can be missed by even the most conscientious person, unless checked closely. The subject matter, cognitive content and emotive content are generally beyond today's wizard and application tool scope of capabilities.

Books are excellent sources for illustrating good writing principles for clear understandable communication so that receivers can draft responses to textual communication. Books on the general topics like Business Letters for Busy People, Letter Writing, Memo Writing etc can be found in most libraries. These teach various formats, standards and styles. Some offer common sense heuristics and devices such as using active voice over passive voice, logical structure and organization, positive attitude tone etc. These can alleviate some of the responders problems if the concepts are fresh or well learned and recalled by the responder at the time of the response. The problem is that most textual communication occurs without the benefit of these aids, limited as they are. Most of these aids have been converted to software and programmed wizards which can do as much or nearly as much as the book resources teach and can do these much more quickly and efficiently. However, these template wizards have severe limitations and concentrate mostly on presentation, not content. Dealing with communication content is a magnitudes tougher challenge, which has eluded even Artificial Intelligence researchers.

Responder's Block

Writer's block can turn into "responder's block." At times we are at a loss as to how or where to start a response. We are lost somewhere between what is proper and what is effective to write in the time allotted. At times, all the correct sentence structure and grammar in the world will not help us to draft that best response, even if we had all the books at our finger tips or embedded in our memories. Presentation and format will not help at that juncture. Occasionally, a format and style template can be a good starting point but it is somewhat generic, rigid or perhaps time consuming to find a generically applicable template for an appropriate response. E-Tools and program features in our current word processors or email programs cannot help because response needs to be personal and message unique, the communication cannot be "mechanical" and must be accomplished in a timely fashion. Research time for an effective best response is usually not available. Moreover, the message may be of a highly personal nature, and not a communication one can turn to a third party for aid in crafting an appropriate response.

Available word processor templates that can be of even marginal help are too simple and one-dimensional to be of much value to solve some of the problems mentioned above. Email response templates appear on the market today and this area cries out for some e-Tools as outlined above as well as for word processors. Today's word processors, publishers and email programs do not help a user to handle the myriad of life's real world communication under everyday unique circumstances. Circumstances which either do not allow time to research for a timely response or are too personal or unique to use one of the available templates. Today's word processors, email programs and publishing software do not identify or address the unique subject matter, relevant issues and or emotive content in a textual communication. What is needed are software tools that will address the emotive content layer in textual communication and help one jump start a real life unique or perhaps highly personal textual response to a received message.

Personal Aids Used in Drafting Responses

Occasionally, in responding to textual communications, one will manually copy a portion of the incoming message to the outgoing response message with bracket markers to indicate that is the portion of the message, which they are responding to immediately following. Typically a portion of the incoming text is copied with accompanying indication that it is a verbatim copy with angle brackets indicating the strings of received text, which will be followed by response text. Then the response portion is edited in below to show the sender that they were understood on that particular item and this is the response to that subject matter. This is a manually intensive method of responding comprehensively and thoroughly which requires several steps. From the sender's standpoint, this type of response message lets them know that they have been "heard" and that at least their message was considered. If there is no mention of the senders subject matter or partial mention on the senders topic a misunderstanding develops because the sender does not know if the receiver "heard", "heard" but does not care, read over it and did not see the subject matter or is saving their response for a later communication.

Reflection of the subject matter involves repeating back to the sender that which they expressed in the communication and which gives the sender the acknowledgment that the responder's communication is focused on and in fact dealing with the senders topic. What is needed are ways that automate this process so that the responder can spend more time actually writing the response and less time copying, pasting and editing.

Ambiguity and Complexity

A general problem in responding to a transmitted communication may be due to its complexity or ambiguity. One can read and reread a received textual communication and still be at a loss at starting an appropriate response, for any of a dozen reasons. Many have been offended by some memo and responded inappropriately, only to find out later that they misunderstood the communication entirely. A sage or therapist friend was not available at the time and an error was made in haste. At times we are under time constraints to "get something out" and we make the fatal mistake of not responding to the appropriate subject matter or worse, hurt the sender's feelings by not responding with adequate concern to a cry for help in cryptic fashion embedded in a portion of the received message. A quick response will not work to maintain a relationship or rebuild a friendship. What are needed are methods and tools which alert us that there is a problem transmitted in the communication which we need to address, a problem which is embedded in the ambiguity and complexity of a seemingly innocuous message.

Reaction vs. Response

Another general problem with responding to received textual messages is that the message may be emotionally charged as a perceived personal attack. In this case we may react instead of to respond. Our emotions can get in the way and sometimes a cooling off period is unavailable. These are the moments where an old sage or therapist would tell us to sleep on it or advise us to draft that "angry" letter response and throw it out before drafting the actual response. What is needed is a sure method to begin a response communication, which will insure that we respond to everything in the received communication in the appropriate fashion.

Turing Test

In looking for programming aids, machine intelligence simulating human response is a good first step in the direction of the Turing Test. The Turing Test is one of the most famous challenges in Computer Science. The imitation game, known as the Turing test, was introduced by Turing to decide whether a concealed responder was a human or intelligent computer program. The basis of the Turing test is simple. An interrogator can communicate with two subjects by typing messages on a computer terminal. The interrogator knows that one subject is a human being and that the other is a computer program, and it is his task to guess which is which. The computer program tries to trick the interrogator into making the wrong identification, while the human being assists the interrogator to make the correct identification. The more advanced programs even tried to show some emotional response to make them appear more human. These attempts at emotive response were unilateral and not stimulated by the sender's questions.

Software designed to read and tokenize grammatical sentences using the various grammar models; simple syntactic structures and complex structures can be found in the literature, public domain, free ware, shareware and commercial business arena. Parsers using dependency approaches based on lexical representation and grammatical rules or the processing of discontinuous text, speech transcripts, incomplete sentences, technical texts are freeware, shareware and commercially available. These software packages can be programmed to tag noun phrases (NP), most verb phrase combinations (VP), apposition of NPs, non-finite structures, passives, small clauses, expletives, binary branching, etc. In fact tagging used to determine the most likely parts of speech for words in a sentence (determiner, adjective, noun, verb past and participle), are freely available in a de facto standard by Brill (1994).

Overall, these programs although a good start in programmed response, have yet to be applied to the textual communication applications of email, word processors or electronic publishing. At least a good part of the reason is that the emotive content heretofore has been an elusive component of textual human communication. Parsers have not been able to token out the emotive states and their associated emotive intensities because average text messages alone carry too much imprecision and ambiguity. What is needed are parsers that can parse textual communication for emotive content which can provide meaningful methods of response.

Application of Available Parsers

Electronic parsers are many and well known. One skilled in the art of programming parsers or compilers can program a reflective parser, which could be modified for our purpose. Programs like ELIZA and DOCTOR were built mostly for the purposes of Artificial Intelligence using application of Rogerian techniques in the early 80's. However, Rogerian technique modified use in computer wizards, tools or automated textual response assistants are non-existent and have not been applied to textual, response applications outside the AI arena as demonstration examples of Turing applications, software "toys" or Rogerian therapy examples. Although parsers have become more and more sophisticated enabling the Turing Test results to continually narrow the man-machine conversational/intelligence gap, the gap still exists. This indicates that a computer program is still not capable of drafting full responses to received electronic communication.

AI's attempts at creating a system that would exhibit real common sense failed. The failure may have been due to the fact that none of the approaches addressed the emotive content layer in basic human communication. It is the parsing and understanding of the emotive tokens that eluded success by most NLP projects. Furthermore, symbolic AI failed because the cognitive obstacles could not be overcome. It is the emotive state and intensity that drives action and weights the subject matter in importance and priority. What is needed are automated tools which will provide common sense and understanding of basic human communication at levels which include the emotive layer and meaningful interaction with the logical, lexical and grammar layers.

There are two basic kinds of language analysis paradigm: the statistical, automatically generated language models from literature, and the linguistic, manually coded language models based on intuition and corpora. Some are based linguistic methods, and are amply documented and evaluated in international language engineering or computational linguistics conferences and publications such as ACL and CoLing since early 1990s.

For some levels of language analysis, statistical analyzers are relatively quickly implemented and trained. Morphologically rich languages where statistical methods have not performed well argue for the linguistic option. Either way, NLPs are available for many applications.

Embedded Emotive Content

One reason that communication can be ambiguous or complex is the presence, or lack of when needed, emotive content to disambiguate the text and words onto the intended meaning out of a number of possible alternative inferences. Methods for embedding emotive content by a sender have been developed in U.S. patent application '624. These can be used to add emotive content textually or graphically to textual transmissions. When emotive content is purely textual, the response is further complicated for reasons such as imprecision in emotive intensity or ambiguity for lack of a more complete description of the emotive state. If emotive content is presented graphically, complexity is increased because the receiver is subjected to overtly emotional component much harder to ignore. Here, the responders must "search themselves for an answer" to transmit to the sender and they wish the response to be correct and appropriate. Today, the receiver cannot take good advantage of computers to generate unique response messages through the use of ordinary societal behavior protocol or proven therapeutic and psychological techniques in responding to theses received textual messages. Moreover, available communication techniques are little applied outside the professional help arena. What are needed are automated methods, which help a responder start a response communication in the right direction, using proven therapeutic and good communication techniques.

Response to Emotive Content

Individuals may at times not respond to the embedded textual or graphical emotive content for any number of reasons. Some responders may wish not to address the emotive content because it makes them uncomfortable. They may not recognize that they are receiving emotive content or they may only recognize partial subjectively perceived emotive content. Responders may not have the language skills to formulate their response and may withhold addressing emotive content for fear of making matters worse through incompetence. Alternatively, responders may knowingly overreact or act wrongly in their reaction, giving them added hesitation or reluctance to attempt to identify and address emotive content. At times, relationships that are predominantly maintained through the back and forth passage of written communication can get bored or strained from conditions occurring to either or both parties. The response to very subtle messages can be vital to a personal or business relationship and a perfunctory response ignoring or not addressing portions of the received message can not only strain but even be fatal to the relationship. The conversational or communication objective in a response should be to remedy the situation and restore fairness no matter how subtle or blatant the message. Ways are needed to provide the capability to discover problems in a more comprehensive, positive, cooperative manner and give appropriate notice to responders where to take extra care with message components.

Therapeutic Resolution

There are branches of counseling, therapy and psychology which have developed optimal response techniques to various situational communications. Mostly these have not been useful in textual communication because the techniques require physical proximity or physical information such as facial expressions, body language, non-verbal and aural clues. Such communication skills such as reflective listening, eye messages, active listening, and empathy can be used but are applicable in a physical visual and aural setting. What is needed is the application of these known successful techniques in textual communication and response. Some, like Rogerian therapy have been applied in natural language parsers, novelty programs and AI research applications.

Rogerian Response Therapy

Computer programmed response was studied by Joseph Weizenbaum, who coded ELIZA at MIT during the years 1964-1966. The ELIZA program consisted of two stages. The first stage used a parser to extract information from what the user typed into the program input interface, while the second stage used a script to formulate a suitable reply which was then displayed to the user. Weizenbaum developed a script for ELIZA, which simulated a Rogerian psychotherapist. Another implementation is commonly known as DOCTOR. This was an "intelligent" program which acted as a Rogerian psychotherapist, attempting to draw the patient out by reflecting the patient's statements back to him, and in this fashion encouraging and leading the patient to derive his own solution. Rogerian therapeutic techniques have not been used to help users in formulating responses to every day modern textual communications, even though the capability has been around for some time.

The need to guess or infer the likely emotional state or personality of the application user is rendered unnecessary if senders are able to embed emotive content directly within textual communication. The functionality, which provides users themselves, ways to embed emotive state and associated intensity along with their textual communication, is contained in application '624. Moreover, a mechanism used to obtain, gather or infer the users emotive state, could be encoded into any of the emotive state glyphs or mechanisms described in referenced application '624 and transmitted along with any textual communication. The Rogerian model has not been used in conjunction with embedded graphical emotive content, which adds another dimension to the possible response capabilities in terms of "human likeness."

What is needed are electronic methods and tools which can quickly scan a received textual transmission and address all of the salient subject matter and emotive content. In addition, to register the transmitted emotive content and start the textual response for responders so that they can begin from a response template custom tailored to the received message. So that the responder can write, finish and reply in a well thought out and well felt, comprehensive, common sensible and emotively appropriate response.

SUMMARY OF THE INVENTION

A large burden of our modern communication occurs through written textual communication. A significant portion of that is for the purposes of establishing and or maintaining relationships. Unintended ambiguity and incompleteness in textual communication can lead to misinterpretation, which can deteriorate any established or new relationship. Responses, which are inappropriate, abrasive, unsupportive, partial or lacking of emotive response, may at best weaken the status quo and at worst lead to irreversible deterioration of the relationship. Proper interpretation and handling of emotive content in responses can consolidate understanding, nourish and solidify any relationship.

An aspect of the invention presents a programmed Emotive Engine which parses received emotive content embedded in text for the purposes of aiding receiver to respond in the "best" textbook communication mode. Psychological, therapeutic, and human communication models are used to build message unique response templates optimally conducive of harmonious human relationships are constructed by software to enable the receiver to edit and finish the details of a thorough subject matter and emotive content response.

A system and methods of creating message unique text and emotive response templates for textual communications in applications executing on a computing device is presented. One embodiment is comprised of parsing and tokenizing the textual communication into the parts of speech, selecting subject matter tokens from the tokenized parts of speech, fetching subject matter starter sentence string fragments from pre-stored data structures containing alternate subject matter starter sentence strings, concatenating the fragment strings with selected subject matter tokens into grammatical subject matter response sentence fragment strings, opening a response file or output device into which synthesized starter subject matter response sentence string fragments are written, such that the application systematically processes the textual communication and synthesizes communication unique response templates populated with response sentence string fragments containing the subject matter to be addressed, recognition of any emotional content and possible relationship enhancing emotive responses in the form of starter topic sentences. The communication unique template generated, could then be edited by responder for details and ultimate decisions guided by the template starter sentences and included emotive protocol for a well thought out and comprehensive reply.

BRIEF DESCRIPTION OF THE DRAWINGS

FIG. 7 shows a typical received communication for processing.

FIG. 8 illustrates a message unique text and emotive content response template resulting from a cycle of operation.

FIG. 9 illustrates examples of communication snippets with cognitive and emotive content.

DESCRIPTION OF THE PREFERRED EMBODIMENT

An aspect of the invention is to provide methods for responding to textual communications, with or without graphical embedded emotive states with associated intensities. Aspects of the invention add emotional intelligence to textual communication, even emotionally charged communication. The invention while implemented in software requires a hardware environment.

Hardware Context

Figure 1:
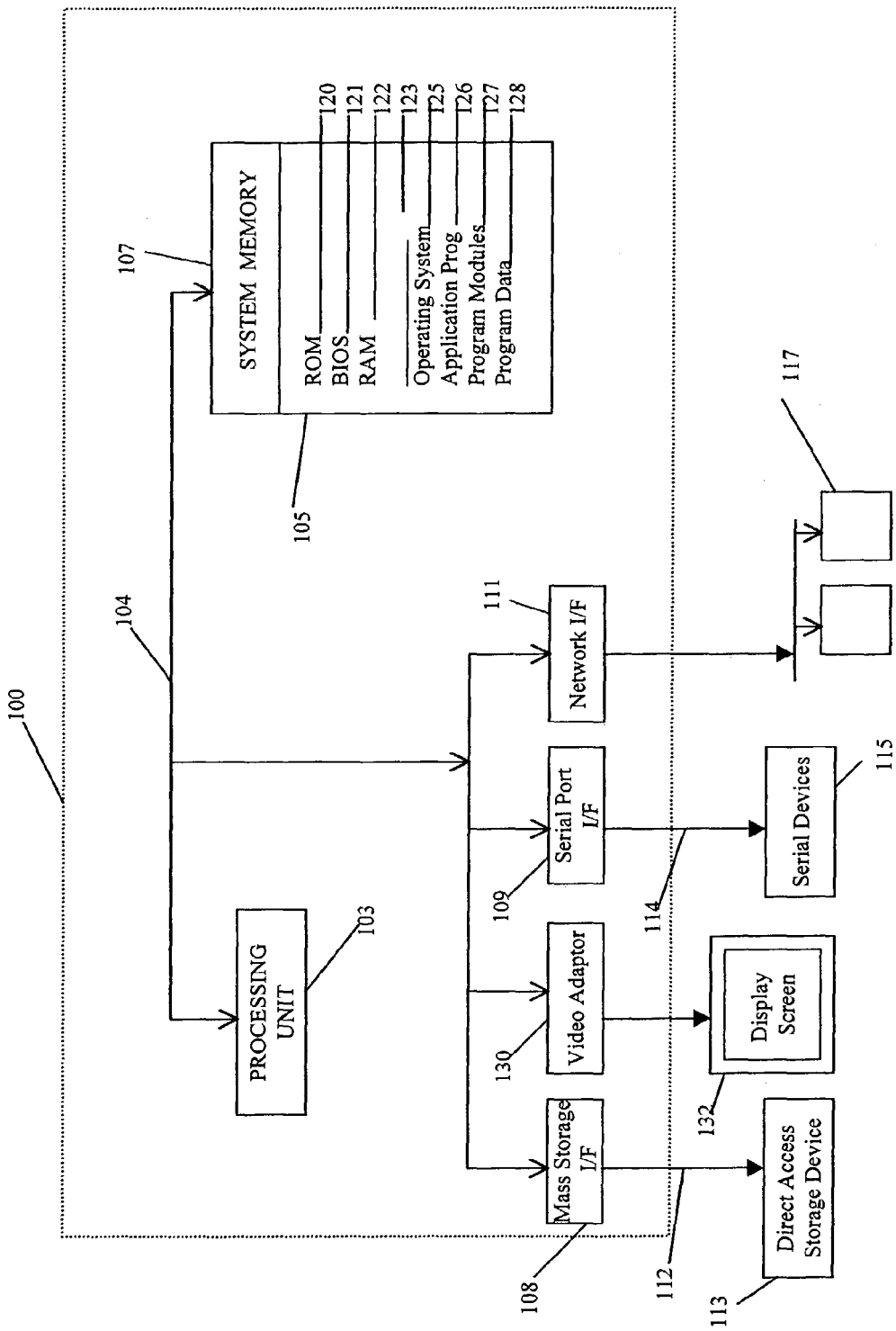
FIG. 1 is a block diagram illustrating an exemplary computer system for carrying out the present invention.

FIG. 1 diagrams a computer system 100, which can host application embodiments of the invention. In one embodiment, the computer system 100 is a typical networked personal computer workstation with at least one Central Processing Unit 103, Memory 107, network interface card 111, Display Screen 132, Mass Storage interface 108 for such devices 113 as hard drive(s) removable disk drives, optical disk storage, floppy drives, I/O buses 112 and 114, Memory Buses 104, etc. For purposes of illustration, embodiments of the invention are provided in the context of a word processor or email software program and its requirements.

Computer system 100 includes at least one processor unit 103, which obtains instructions and data via a system bus 104 from a main memory 107. Illustratively, the processor is a PowerPC available from IBM or a level of Pentium processor from Intel. More generally, however, any processor configured to implement the methods of the present invention may be used to advantage. The main memory 107 could be one or a combination of memory devices, including Random Access Memory 122, nonvolatile or backup memory, (e.g., programmable or Flash memories, read-only memories, etc.) and the like. In addition, memory 107 may be considered to include memory physically located elsewhere in a computer system 100, for example, any storage capacity used as virtual memory or stored on a mass storage device 113 or on another computer coupled to the computer system 100 via system bus 104. Illustratively, the main memory 107 contains executable programs, which manage the hardware and control the software programs 105. The ROM 120, BIOS 121, and Operating System 125 are a system of programs, which manage the hardware and software resources for the use and running of application programs. The memory 107 further contains application programs 126 specifically, a email, word processor, text editor, publishing tool, web builder etc for purposes of an embodiment of the invention. In one embodiment, the application is an email application. Since email applications have been ported to almost all platforms and operating systems currently in use in the market place, these can all eventually benefit from aspects of the present invention and serve to broaden the scope of the invention. Program modules 127 and Program data 128 would typically also be resident in main memory 107 along with other programs 125 which can be paged or swapped in from other memory sources, local 108 or networked 117. Software components and objects are but parts of programs, which reside together in various regions of addressable memory and are executed to produce the necessary application functions. Software components and objects themselves can be broken down into data structures and programming logic which use the data structures. Generally, program modules 127 include processes, programs, objects, components, data structures, etc. that perform particular tasks or implement particular abstract data types.

The computer system 100 includes a number of operators and peripheral systems. Illustratively, these include a mass storage interface 108 operably connected to a direct access storage device 113, which can be such devices as hard disks, optical disk drives, floppy disk drives, optical storage, at least one input/output (I/O) interface 109 operably connected to I/O devices 115 such as modems, wireless broadcaster devices, audio, communication via serial protocol bus 114 such as IEEE 82xx, Firewire, RS232 etc, and a network interface 111 operably connected to a plurality of networked devices 117 which can be mass storage, other computers, wireless devices and other networked devices. The I/O devices 114 may include any combination of displays, keyboards, track point devices, mouse devices, speech recognition devices and the like. In some embodiments, the I/O devices are integrated, such as in the case of a touch screen. The networked devices 117 could be displays, desktop or PC-based computers, workstations, or network terminals, or other networked computer systems. As such, aspects of the invention can be practiced on a single computer system as well as over a network of computer systems.

A number of program modules may be stored on the mass storage device 113, ROM 120 or RAM 122, including an operating system 125, one or more application programs 126, other program modules 127, and program data 128. A user may enter commands and information into the workstation 100 through input serial devices 115 such as a keyboard or pointing device. Other input devices (not shown) may include a microphone, joystick, game pad, satellite dish, scanner, or the like. These and other input devices are often connected to the processing unit 103 through a serial port interface 115 that is coupled to the system bus, but may be connected by other interfaces, such as a parallel port, game port or a universal serial bus (USB).

A monitor 132 or other type of display device is also connected to the system bus 123 via an interface, such as a video adapter 108. In addition to the monitor, personal computers typically include other peripheral output devices (not shown), such as speakers and printers.

The personal computer workstation 100 may operate in a networked environment using logical connections to one or more remote computers, such as a remote computer 117. The remote computer 117 may be another personal computer, a server, a router, a network PC, a peer device or other common network node, and typically includes many or all of the elements described above relative to the personal computer 100. The logical connections depicted in FIG. 1 include a local area network (LAN) and a wide area network (WAN). Such networking environments are commonplace in offices, enterprise-wide computer networks, intranets and Internet.

When used in a LAN networking environment, the personal computer 100 is connected to the local network 117 through a network interface or adapter 111. When used in a WAN networking environment, the personal computer 100 can connect via modem 115 or other means for establishing communications over the wide area network 117, such as the Internet. The modem 115, which may be internal or external, is connected to the system bus 114 via the serial port interface 109. In a networked environment, program modules depicted relative to the personal computer 100, or portions thereof, may be stored in the remote memory storage device. It will be appreciated that the network connections shown are exemplary and other means of establishing a communications link between the computers may be used. For example, wireless devices with screens are becoming more prevalent. These are used for textual communication on cell phones, PDAs, Internet devices and combinations of these devices and are all within scope of the instant invention.

Applications such as word processors, email, messaging, publishing software executing across networked computing devices are potential candidates for implementation of aspects of the invention.

Relationship Depth Level, Roles and Response

Figure 2:
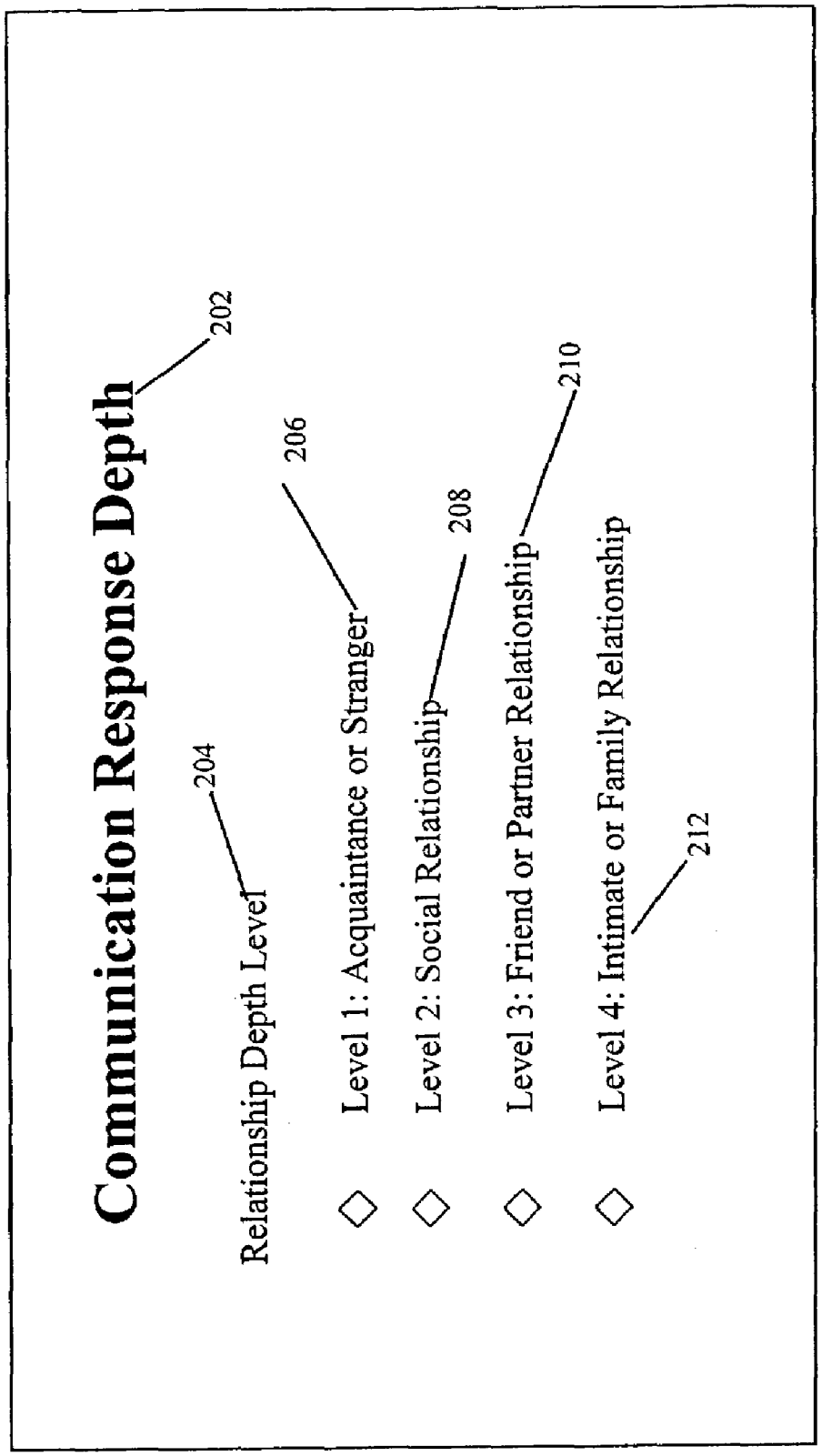
FIG. 2 depiction of a response level selection defining the depth level of the sender receiver relationship for a received communication

Situational, circumstantial and structural roles in relationships dictate the type of socially acceptable communication between parties and hence the appropriate depth of the response. As in verbal communication, the relationship is between a sender, publisher and receiver, recipient or responder. A business relationship will start with a response with reflects the subject matter received and perhaps details concerning the topics discussed. More personal and intimate relationships demand a "deeper" response, one that deals with sharing of the emotive content and not mere subject matter exchange. There is a continuum of "appropriate" response strategies, which is based on social, cultural and political norms. FIG. 2 shows an embodiment of receiver selected relationship depth level options dialog 202 with four selectable relationship depth layers 204 to chose from starting with; Level 1, Acquaintance/Business Relationship 206, Level 2, Social Relationship 208, Level 3, Friend-Family 210, and Level 4, Intimate Relationship 212. The relationship depth levels progress from the superficial to an intimate relationship level, starting with a level 1 206 reflective subject matter response basis and progressing to reflection and sharing of subject matter as well as emotive content at level 4 212.

Responder selection of Acquaintance/Business Relationship 206 would invoke a Reflective Subject Matter model implementation. Selection of Social Relationship 208 would invoke both Reflective Subject Matter model and Emotive Validation model implementations. Selection of Friend Family 210 would invoke Reflective Subject Matter model, Emotive Validation model and Thought-Action implementation. Selection of the Intimate Relationship 212 level would invoke Reflective Subject Matter model, Emotive Validation model and Emotive Response model responses. The response layer options roughly correspond to the options in a relationship depth model, i.e. the depth of the response is author selectable and are typically in proportion to the closeness of the relationship, increasing in relationship intensity or bond from stranger/acquaintance level, to deeper emotive response levels up to intimate friend or partner. The relationship depth level typical example corresponding relationships are summarized as follows:

| Depth Level | Relationship |
|---|---|
| Level 1: | Stranger, Acquaintance, Seller/Buyer, Boss/Subordinate |
| Level 2: | Facilitator/Group or social relationship |
| Level 3: | Partner/Associate or friend |
| Level 4: | Parent/Child or Intimate partner |

An aspect of the invention provides response models corresponding to relationship depth, which dictate the type of the social discourse, inherent communication appropriateness and the communication protocol. For example, Reflective Subject Matter model may be most appropriate for a Seller/Buyer, Boss/Subordinate, Stranger or Non-acquaintance response level where communication transpires on objects of a well-defined nature. Reflective Subject Matter mode and Emotive Validation may be appropriate for a Facilitator/Group or social relationship where relationships start to include communication including some feelings. Reflective Subject Matter mode combined with Emotive Validation mode and thought/Action Validation mode may be more appropriate for Partner/Associate or friend where the thoughts and feelings are both freely exchanged and begin to weight to interact with each other. Reflective Subject Matter mode, Emotive Validation, thought/Action Validation and Emotive Response maybe most appropriate for Intimate friend or partner where thoughts and feelings interact and have weight and affect on communication when communication requirements exceed quality of textual communication transmitted. Aspects of the invention discuss simple embodiments of implementations of these models below.

Invocation of Message Template Response Tool

Figure 3:
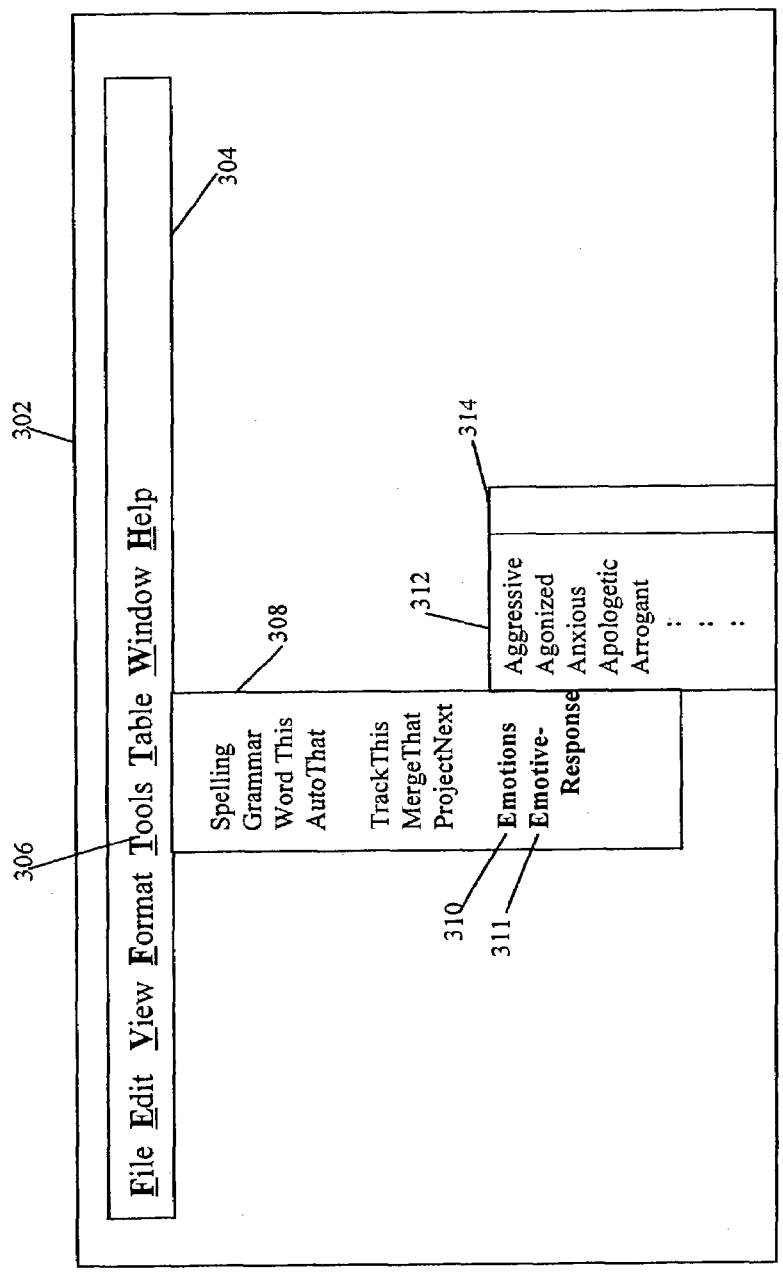
FIG. 3 illustrates a user interface menu implementing emotive response functionality.

FIG. 3 illustrates a small part of the interface embodiment of and aspect of the invention implemented on a word processor, email, Messaging or publishing application. A menu 302 driven user interface 303 could be augmented to add the communication response template function to a list of already existing menu item application tools 306 and functions 308. Upon invoking a menu item entitled EMOTIONS 310 a submenu can open allowing the user to choose from a number of emotive states 312 and associated intensity choice list 314. Choosing EMOTIVE RESPONSE 311 would invoke an option dialog as shown in FIG. 2.

General Response

While the emotive states and their associated intensities provide the alphabet or lexical tokens, the modes of human behavior protocol provide the grammar or rules of communication protocol. An aspect of the invention would be to provide a systematic and comprehensive response to all content in the received communication, not just those items remembered at time of response draft time or those items most important to the responder or those excluding emotive content because the tools do not exist to aid the responder in real time. Emotive content would include author emotive state and associated normalized emotive intensity along with any textual matter selected, demarked or coinciding with the emotive matter.

Emotive and cognitive content parsed in from a received communication, is generally processed by 1) decoupling the cognitive from the emotive content, 2) identifying the elements of the cognitive content and the states and associated intensities of the emotive content, 3) applying generally accepted effective communication and therapeutic rules, techniques and principles, and 4) apply an appropriate response such that the responder can reflect the subject matter of the message, validate the sender's cognitive as well as emotive content, and offer their own feelings. These are written to file template or an output device such display or network device. The resulting editable or temporary file then provides the responder with the best possible response template, a message unique template which serves the responder to complete a response message, a message, which will be perceived in the best possible light by the originator of the communication. Emotive content would include author emotive state and associated normalized emotive intensity along with any textual matter coinciding with the emotive matter.

Basic Approach—Divide and Conquer

An aspect of the invention formulates topic and or supporting sentence(s) for each block, idea, feeling or paragraph in the received message, and creates a message unique counterpart for each of these in the message unique response template. Topic and or supporting sentence(s) for each block, idea, feeling or paragraphs are processed into grammatically correct support sentence structures, starting sentence fragments or complex sentence structures. The responder could then complete a comprehensive and insightful response to the received message; by editing the message unique template transmit their response. The responder side is tasked with decoding, tokenizing, decoupling and determining the emotive content in the received message and sending emotive intensities normalized to the responder in association with the response model. The receiver, in responding, typically determines or sets the relationship parameter in this embodiment.

A high-level view of one embodiment of the invention implements a program to 1) parse the received message by paragraph, sentence block, complete thought or feeling, 2) parse, tokenize and tag parts-of-speech communication components ie. the subject clauses, noun phrases, verb phrases, feeling word phrases for emotive states and associated intensity modifiers, graphical emotive states and associated emotive intensities, 3) identify and formulate appropriate cognitive and emotive reflective structures into strings, 4) apply selected emotive response model, 5) fetch starter sentence string fragments from pre-stored data structures containing alternate same response model starter sentence strings so that responses do not appear redundant and read normally, 6) synthesize grammatically correct topic and supporter sentences; 7) format the response template paragraph topic or block starter sentences into template files and or to the display screen for each received and parsed paragraph or block until all received message paragraphs are processed; 8) analyze emotive intent and warn of anomalous emotive behavior and 9) generate a message unique template complete with salutation header and topic sentences for each received paragraph, which the responder can edit to produce a comprehensive, complete and emotively optimal response template message.

In broad terms, this aspect of the invention allows for textual applications to "perceive" appraise and express emotions with textual content. This task is accomplished by allowing the responder to specifically address any textual or graphical emotive content without initial ordinary awareness sense or emotional intelligence.

"Feeling" words are pre-defined language connoting emotive states and for which there are also pre-defined emotive state modifier words which linguistically operate on the feeling words to modify the emotive intensity. These pre-defined feeling words are maintained in data structures for access in parsing the communication and tokenizing into program objects which can be identified, modified for root, tense or part of speech for concatenation with stored string fragments to form grammatical but not necessarily complete sentence stings. The incompleteness of the sentence means only that the string fragment can become a complete sentence with deletions of some "slot" words, words tokenized from the communication and selected for concatenation into the fragment at a particular blank space meant to hold the word, or optionally additional strings at the end of the fragment string left open for the responder to complete with detail. Pre-stored subject matter, thought-action, emotive validation and emotive response string fragments can include stored memory data structures as lists, arrays, queues, databases, structures, or other types of data structures which can be fetched as data objects in executing programs. Such data structures can also contain emotive word and associated intensity modifier words in a program accessible formats.

An aspect of the invention provides the responder with a message unique template which is comprehensive cognitively and emotively, systematically organized, contains all material subjects to be covered and all emotive content matter to be addressed so that a user could complete the response message conveying to the sender that they have been "heard", "felt" and totally understood. The responder could then edit the template adding the details and substance of the actual response by using the template paragraph topic sentences, headers, reminders and emotive protocol provided in the template response message. This aspect of the invention implements a method to facilitate cognition by responder as well.

An embodiment of the invention will make use of a Natural Language Parser (NLP) to extract information from the received communication for the textual parts of speech language cognitive layer, found directly from the text of the received message. An emotive parser is coupled with the NLP to tokenize the emotive content in the communication. The emotive parser may contain several stages for several layers for extracting and decoding natural language emotive content as well as visual emotive content. Output from both parsers will be used in formulating responses using known effective communication principles and therapy techniques. The decoupling of the cognitive and emotive content into identifiable token streams is an aspect of the invention which lends itself to a synthesis process based on analysis and application of effective communication principles which can build from individual elements of a message without the inherent ambiguities and confusion typically encountered without the decoupling. Using the decoupled emotive content in conjunction with parsed subject matter and textual grammar tokens, this aspect of the invention breathes life into the responses by adding a human element to the response, something that the receiver would add if they had training in effective principles of communication, psychology and therapy techniques.

Figure 4:
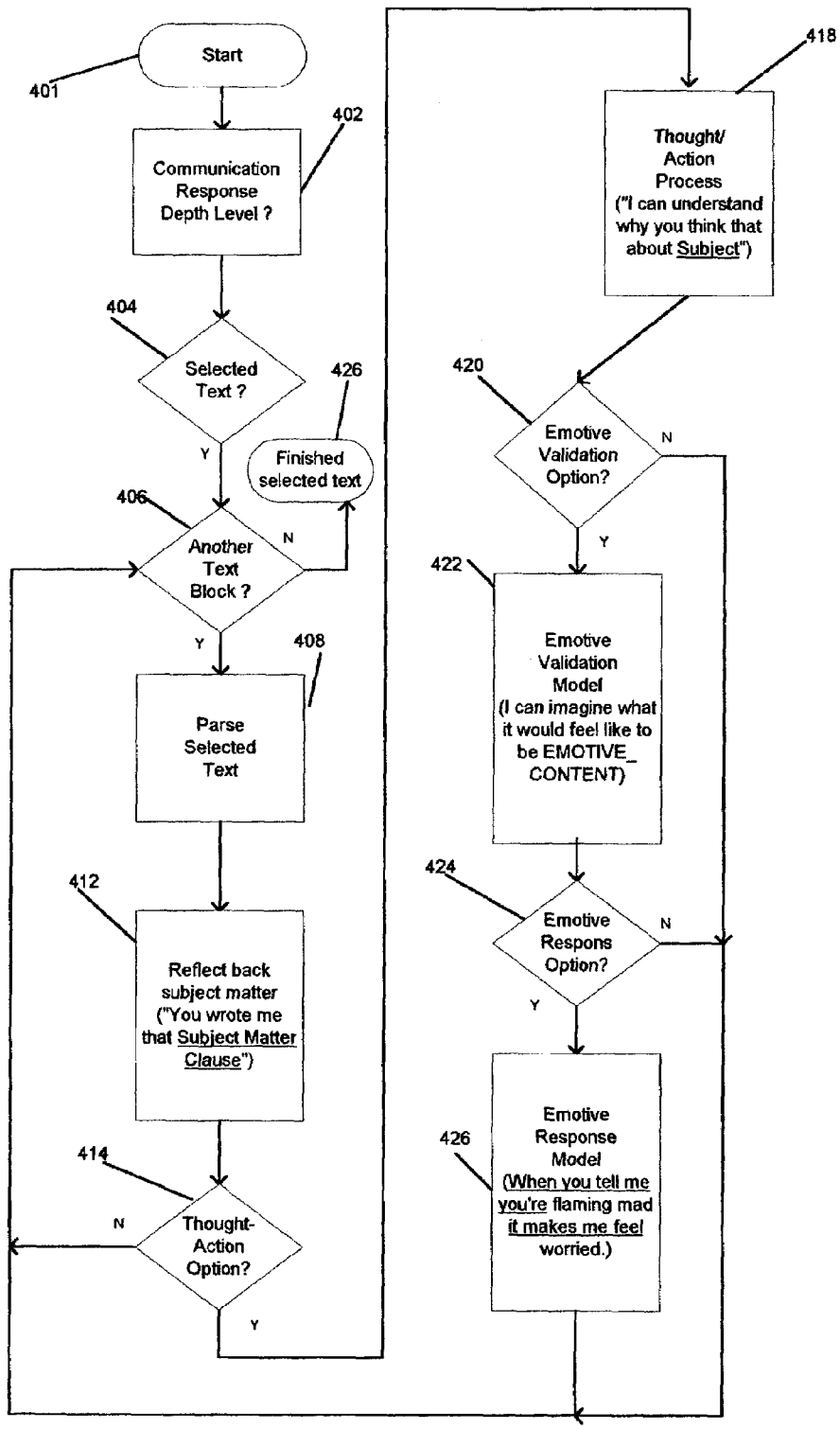
FIG. 4 High-level flow diagram of the relationship level selection logic and commensurate response model application.

The bulk of the substantive analytical basis is contained in the Subject Matter Reflection 412, Thought-Action 418, Emotive Validation 422 and Emotive Response 426 models represented in the FIG. 4 high-level flow diagram showing the relationship level selection logic and commensurate response model 412 418 422 426 application. The application of these models in aspects of the invention defines the content and structure of the response sting fragments used to connect the identified and selected communication components. These make use of emotional knowledge and sound emotive response counseling, therapy and communication techniques.

Natural Language Parsers (NLP)

One skilled in the art can adapt publicly or commercially available NLP to an aspect of the invention for a particular application. A fundamental mode of operation would require a tokenization, and tagging of the communication's parts of speech components and most NLPs do that as a minimum. The NLP will identify the subject matter components, which may include such parts of speech as nouns, noun phrases, pronouns, subjects, objects and speech forms of subject matter. In addition the NLP will, tokenize and tag action components such as verbs, verb phrases, adverbs, and colloquial expression for action. For some embodiments of the invention, the NLP will parse in parts of speech and the component relationship in a grammatical sense, as for example subject matter and related action words. Formulation of appropriate grammatical strings taking into account action word tense or conjugation, and concatenation into target appropriate string fragments into topic or supporting sentences can be accomplished by available grammar programs by one skilled in the art.

The response model and sender-responder relationship depth level of response required will determine the appropriateness of the target topic and support sentences. The relationship depth level is responder selectable in a simple embodiment. One skilled in the art can adapt these available software tools to tokenize and tag text into the basic parts of speech components and formulate them in accordance to language grammar rules as required by embodiments of the invention.

An aspect of the invention structurally decouples the subject matter from the emotive information, and certain advantages in response are attained in analyzing complex and ambiguous human communication.

Emotive Parser

Graphical emotive tokens embedded in the communication would be tokenized in accordance with an encoded scheme or standard. Several methods are proposed in U.S. patent application '624 whereby the graphical content is embedded in the textual datastream via encoded non-printable characters which carry the emotive graphics representatives in accordance with some pre-defined numerical label scheme whereby as set of 63 emotive glyphs are represented by a number which gets packed with the textual communication at the location of its display location with the text. A program which can parse out encoded non-printable characters in a datastream using known techniques and technology can be written by one skilled in the art. Once decoded, the emotive content can be subjected to emotive validation and emotive response models of the receiver in further processing.

Reflective Subject Matter

Reflective subject matter can be accomplished in a simple embodiment through the use of noun phrases in incoming communication. Noun phrases would be extracted line by line for a particular block or paragraph, tokenized and redundancies filtered to provide a minimum subject matter list. This list will provide for a systematic and comprehensive approach responding to all subject matter in received communication. Since each item on the list is processed for redundancy with other items with same or similar meanings on the list, the responder's task is lightened by not having to ascertain whether all subjects were covered. An aspect of the invention employing a natural language parser would systematically tokenize the subject matter by paragraph or sentence blocks. Stored word strings of the type typically found in usage combined with the subject matter tokens in grammatically correct topic and support sentences would be created systematically through the entire received message. The stored word stings are connective in nature and from a collection of string fragments saved in any number of data structures, which are organized to be searched, and for alternate elements. Such stored strings can be stored in data structures such as string arrays, lists, queues, compound structure or databases. Using a systematic parsing paragraph-by-paragraph approach, subject matter could not be forgotten or inadvertently left out. Moreover, main topics and subjects when reflected back, give the sender the knowledge that their initial communication was carefully read. There is no need to pass a Turing Test since the responder will edit the message unique template to augment details and substance to complete the responding paragraph or block.

A simple embodiment using a natural language parser would provide an aspect of the invention to select out the noun phrases for concatenation with stored text strings. In this embodiment, the noun phrases could be compared to each other through an electronic dictionary and or thesaurus to filter out the repeating or similar noun phrases, into a smaller set of potentially addressable subjects. This can be done on any selected part of speech tokens as communication dealing with a matter can describe that matter in different ways, the importance to the response is to deal with the subject matter itself. In yet another embodiment, the degree of repetition of subject matter in noun phrases would indicate that a particular paragraph is given more weight in analysis and response formulation. For example the subject's placement in the paragraph, amount of supporting sentences, repetition is like or similar terms would all be mapped into perhaps one reference in the response message template with and perhaps an alert message to the responder to take additional care with the substantive weight of the subject matter.

Examples of the stored text strings are underlined and concatenated with the parsed tokenized noun phrases:

"Regarding the NP you wrote of, I think . . . "
"Concerning NP . . . "
"Your note reminded me of NP1, NP2, NP3 . . . "

where NP, NP1, NP2, NP3 are a list of noun phrases tokenized out of the received communication sentence or paragraph block. The noun phrases in a particular paragraph or block would be parsed, filtered and structured into starter topic sentences, which would form paragraph topic or starter sentences or fragments together comprising a part of the response unique template. Stored text strings are integrated and concatenated with the noun phrases to form grammatically and syntactically correct paragraph topic and supporting sentences. This technology is known and available to those skilled in the art and are currently manifested in most word processors under tools and spelling/grammar menu selections.

Technical textual communication can also be heavily subject matter weighted. For example, upon receipt of this example highly technical input sentence:

"Functional changes are early indicators of growth in clonal development of the hematopoietic system but they equally indicate signaling for specific actions of differentiated cells" a parser would yield 6 noun phrases; functional change, indicator, growth, clonal development hematopoietic system, specific action and differentiated cell.

For a communication, which has many technically complex subject matter components, the strategy would be the same but the synthesized sentence fragment would be more structured to accommodate the complexity. This would be accomplished by identifying the subject matter components by tagging noun phrases and concatenating a numerically structured subject matter concatenated string fragment to synthesize a reply to the above-received communication. The response may contain the following reply string fragment:

"Concerning the functional changes, indicators, clonal development hematopoietic system you wrote about. My thoughts are generally as follows.
First, the functional changes
Second, the indicators
Third, the clonal development
Fourth, the hematopoietic system
Fifth, the specific action
and last, the differentiated cell . . . "

where the underlined words are the stored string fragments used in synthesizing the response sentence structure and the non-underlined strings are the tokenized and tagged subject matter components from the above received message. As shown above, an aspect of the invention provides the responder with response sentences are created and which comprehensively cover the subject matter that the sender is concerned with as found in the receive message and tokenized on a subject matter group. Moreover, with the topic sentences created in the response template, the responder cannot accidentally omit or forget subject matter mentioned in the received communication. In addition, a partial subject matter response would imply that the responder did not carefully read the communication or all ideas did not register and the responder is discounting part of sender's message without explanation. An aspect of the invention provides the responder with a starting response which allows them to consciously make the decision as to which parts of the subject matter they will respond to if only a subset, editing out and adding text as desired to explain and expand.

Some paragraphs or sentence blocks will have more noun phrases than others. Another aspect of the invention will be to process the noun phrase token list to filter out the minor subjects tokens. This could be accomplished in many ways. Subjects in the topic sentence are usually the most important so they will have added weight. Objects and pronouns will also be filtered out in the simplest modes. Since responder will edit the template, the remaining list of subjects can be concatenated with the connective strings and separated by commas, so that responder can exercise discretion in deciding what is the ultimate subject matter, which needs reflection. Strategies of random connective stings from string collections, least used, least used in above paragraphs, etc can be implemented as well in creating good starter sentence structures without displaying machine like redundancy, repetitiveness or otherwise uninteresting responses.

Thought Validation Process

Though validation lets the sender know that he or she was "heard" and understood. This communication technique cultivates the relationship and is quite often overlooked as something that is not needed because it is so obvious that a person has been "heard" if they spoke it. Omission can be a big mistake and a small line reminding the responder to add something of this nature can pay dividends in strengthening and growing a communicative relationship. Examples are as follows, where the underlined string portions are connective stings from a collection of string fragments saved in any number of data structures, which are organized to be searched, and for alternate elements. Such stored strings can be stored in data structures such as string arrays, lists, queues, compound structure or databases. The NOUN_PHRASE tokens are parsed in by the parser stage for a particular paragraph or sentence block.

I can understand why you think that about NOUN_PHRASE.

I see your point about NOUN_PHRASE.

I can appreciate that NOUN_PHRASE is on your mind.

I realize the you are very aware of NOUN_PHRASE.

Connective strings are concatenated with the received NOUN_PHRASE to aid in forming a good response and is added to the response template for a particular received paragraph/sentence block.

Emotive Validation

An objective and an aspect of the invention is to provide well known communication and therapy response techniques in generating grammatical sentence fragment which the responder will find useful in drafting textual response communication. Aspects of the invention would provide the rudiments of an insightfully good response in the form of grammatical sentence fragments dealing with the senders emotive as well as cognitive content in an editable template from which a responder can complete and send a response message. Aspects of this invention would assist users in responding to and cultivating relationships through electronic communication applications.

Effective communication experts concede that denying or not addressing expressed, implied or inherent feelings between parties only impedes communication and deteriorates the relationship. An aspect of the invention incorporates techniques such as reflective listening into the response template. These techniques show a mutual respect by demonstrating that the sender's feelings were recognized and accepted. Emotive content is further bifurcated into textual and graphical manifestations. An aspect of the invention is embodied in a computer application allowing conveyed emotion in textual communication to be processed and responded to directly. The received emotive component can be tokenized by searching on 'feeling words' defined in a pre-selected group or set of stored word strings commonly used to convey emotions and emotive qualifiers (see '624). Inferences are made to project the emotive state and associated intensity from these textual emotive tokens or found directly from embedded emotive graphical content associated with a textual message such as through face glyph state-intensity pairs or other graphical emotive artifacts encoded with the text (see '624). This emotive content can have dependency relationships to pre-selected cognitive content, which can aid in clarification language ambiguity. Inferences from the received emotive state relationship to the cognitive message in filtering ambiguities of possible meanings to derive the sender's intended meaning can also me made are shown below in more detail.

Textual Emotive Validation

An emotive text validation embodiment parses, tokenizes and tags a communication for emotive state feeling words and emotive state feeling word modifiers pre-defined in a stored memory list of emotive words and stored memory list of associated intensity modifier words respectively. The emotive content is then managed as software objects, which can be compared with other pre-defined words and identified, as a feeling word, or numerically quantified, modifier feeling word intensity to numerical value translation. Parser manipulation of software objects of this kind is known to one skilled in the art.

Synthesis of grammatical emotive sentence strings from the parsed, tokenized, filtered and translated communication word strings relies on therapeutic and good communication techniques. If for example the sender included emotive content that translated to anger at some intensity level, the response should include communication to acknowledge that the sender's emotive state, anger, was indeed felt by the receiver. An example below illustrates this point. A received sentence may be:

Sender: I'm really angry that Bill was so nasty.

where Bill is represented by a tokenized NOUN_PHRASE NP1, angry is a tokenized emotion FEELING_WORD and so nasty represents a tokenized NOUN_PHRASE NP2, and really represents a modifier feeling word MOD_FEELING_WORD which can be translated to a numerical emotive intensity associated with the emotive state angry.

The tokenized sentence would recognized as:

Sender: I'm really FEELING_WORD that NP1 was NP2.

A non-response or no acknowledgement of the emotive content are generally poor options which would tend to wear on a relationship. Other typical responses, which take alternative positions, are Responder1: NP1 is entitled to be NP2 because . . .

Responser2: Yes, NP1 was way out of line . . .

A reflective emotive response, would be:

Responder: "It seems that you are FEELING_WORD with NP1 over NP2."

The possible responses are not unreasonable, but the reflective response is the recommended starting point for effective communication, which acknowledges the sender's feelings. The other responses could still follow the emotive validation response but without the reflective emotive response in advance, the sender will be missing vital acknowledgment information validating the sender's feelings. Responders could then edit whatever additional content they wish into the message using the offered topic sentence or not. An aspect of the invention would be to provide a complete reflective response text, which contains the minimum parts necessary to maintain and grow the relationship through a continuing dialog. A implementation of this aspect of the invention can also be done by filtering the parser tokenized verb phrases through a 'feeling word' dictionary resulting in catching FEELING_WORD in the sender's text. As above, underlined text in the reflective response represents the stored connective text strings, which would be used to structure the response sentence with the emotive phrase between the subject and object.

The stored text strings aspect of the invention would supply the connective strings, fragments and structures. So that perfunctory and predictable language from repetitive connective string use does not permeate a response, sufficient set of stored stings will be uniformly applied in rotation, allowing variances in the response sentence structure but preserving the emotive validation and reflected subject matter. For example the above response could also be, Responder: "I can imagine what it would feel like to be FEELING_WORD with NP1 overdoing NP2,"

As with the first phase, these starter sentences in the template may not be complete or but they will serve as reminders to guide the responder towards a more optimal response to the received communication.

To one skilled in the art, the synthesis of the response string fragments is programmable. The emotive content and parts of speech are identified from the communication through decoding the communication and applying NLP, dictionaries and thesauruses for word comparisons for minimizing the response set of objects to address, grammar checkers are available for translating string fragments to grammatical string fragments. Pre-stored sets of text starter connective stings are available from stored data structures-containing appropriate candidates to suit the response model requirements. Feeling word collections and databases are well established and the rules of grammar to concatenate the identified communication components and stored strings well known. An aspect of the invention parses the textual communication and synthesizes a response based on received communication components and rules of grammar and good communication. For example, a reflective response could be put more generally by:

"It seems that you are angry with Bill over being nasty."

The EMOTION component parsed as "angry" is matched tagged from a set of stored "feeling" words. "Bill" is the subject component and "being nasty" is the object clause component. As above, the interlined text is the pre-stored string fragment from a set of stored string fragments reflecting the teachings of a particular model. These strings can be accessed from alternate fragments strings to accommodate more components. An aspect of the invention creates the response string using the emotive content, textual and graphical. The general steps taken are 1) parsing, tokenizing and tagging the received communication into emotive tokens and parts of language components, 2) filtering components through a thesaurus, dictionary and or feeling word text string list to reduce the list by eliminating same or similar meaning words, and 3) synthesizing grammatical text strings by concatenating the appropriate response level model stored connective strings with the emotive content components, and identified parts-of-speech communication components. Subject and object components can be whole clauses or phrases, which many NLPs can token out as complete noun phrases. Thus although the above illustrated example is straightforward, the same principles can be used in more complicated textual communications.

In yet another embodiment, the reflective response would use adverbs or adjectives as "intensity" words to communicate the intensity of the emotive content in the response. For example in the above case the reflective response with the intensity would be, "It seems that you are really angry with NP1 over NP2. The tokenized adverb "really" or an equivalent adverb can be associated with an intensity normalized to a numerical level with some constant minimum and maximum values for example between 1 and 10. These adverb tokens would serve to scale the emotive intensity and are needed in the response to be emotively reflective at the same level to be fully responsive. "Really" would be numerically equivalent in intensity to "extremely", "especially" or "very" and therefore can be interchangeably used in the response. The example response could equivalently be "It seems that you are extremely angry with NP1 over NP2" or alternatively "It seems that you are livid with NP1 over NP2." "Extremely" carries emotive intensity as a modifier to an emotive state. Other such words are as "really", "so", "very", etc. The feeling word "Livid" carries the intensity and emotive state content "extremely angry" or angry/10.

Since there are many more words representing emotive states and associated intensities than there are graphical representations of emotive state-intensity, a database of feeling words equivalences from one emotive state-intensity to another emotive pair can be used in a aspect of the invention translating vectorized emotive content, emotive state with magnitude, to make translations from feeling words to graphical emotive representations or in reducing redundancy in feeling words by filtering out similar emotive content for more narrow tailoring of response components in synthesizing response fragments. This can also be effectuated by systematically comparing the found feeling words through a dictionary or thesaurus for alternate feeling words of similar meaning which can themselves be compared against other found feeling words in the communication and in thus fashion, remove the redundant feeling words and processing only the stripped set of feeling words with their associated emotive content. This will tend to produce the lowest number of response strings and reduce confusion.

Yet another aspect of the invention is to create response string fragments, which will repeat or echo the subject matter to the sender in grammatical form of a response for tokenized, filtered subject matter components in a minimum set of identified components to be addressed. For simple embodiments, this set will be use in the creation of topic sentences. This will help to structure the domain of discourse as well as the response in a comprehensive matter according to subject matter received. The simpler embodiments, match the 'feeling' word string tokens related to subject matter and verb phrases. More complex embodiments will enhance the intelligence of the responses through large response pre-formatted databases linking emotive states and intensities with cognitive subject matter for the sender intent analysis described in more detail infra.

As the reader will appreciate, emotive response techniques seek to establish rules of illogic and interaction with logic to formulate optimal responses. Melding cognitive reasoning and illogic and rules of emotional transactions are an aspect of the invention which combine a linear analysis and simple response model for application in uncertain or ambiguous textual communication.

Graphical Emotive Validation

Some text messages will contain graphical emotive content. Reflective Listening therapies dictate validating senders feelings in the responses as they are received. The responses in these situations are documented for most emotive states and some examples of graphical emotive content and responses are:

"Your frown seems to say that you disagree."

"When your face lights up that way, you look very happy."

"Looks as if you are really upset. Want to talk about it?"

A list of connective string generic strings for emotive validation can be stored and used to build complete sentences or starter fragments in a random fashion or by associating groups of generic strings with particular emotive states preferentially. These connective strings are concatenated with the parsed emotive content to form complete response starter sentences. EMOTIVE_STATE1, "Frown," EMOTIVE_STATE2, "very happy," and EMOTIVE_STATE3, "really upset" are the parsed tokenized emotive content concatenated textually within the stored connective strings. These emotive states have associated stored strings, which are reflective in nature of the associated emotive state. The ones used above are stored as:

Sting1: "Your EMOTIVE_STATE1 seems to say that you disagree."

Sting2: "When your face lights up that way, you look EMOTIVE_STATE2."

Sting3: "Looks as if you are EMOTIVE_STATE3. Want to talk about it?"

In the event that a sender is not sure of his or her feelings with regard to a particular textual passage, the sender is free to associate more than one emotive state with a selected textual passage and this will be encoded as such. In this scenario the receiver, when decoding and parsing out the emotive content, will note that a particular textual string has more than one emotive state and make reference to the senders ambivalence in the response. An aspect of the invention can perform an ambivalence analysis to wring out any potential helpful responses, which directly address the ambivalence in some fashion.

Subject Matter and Emotive Response Models

Another aspect of the invention is the capability to assess subject matter as it relates to emotive content and make programmed responses available to responder in various forms. These forms could come in the form of textual strings synthesized for the responder's response template or alert messages to the responder that a "signal" was received in the message and that "signal" could indicate some action is likely to be taken by the sender and appropriate anticipatory measures could be taken. For example if the communication contains some mention that the sender is going to be alone or is alone, contemplating going to the drug store or other comparable pre-stored "alert" noun clause and the emotive content shows that the sender is depressed at a significant intensity level, then perhaps the response should contain a message to the sender that the responder can help in some way. In one embodiment, an alert message would warn the responder separate from the response template that the sender may be experiencing psychological problems and is reaching out for help.

Some parsers offer both information for word-form tokens and functional dependencies representing relational information in sentences. These can tokenize simple and complex entities in sentences and describe relations between objects (noun phrases), actions (verb phrases), and circumstances (where, when why, how, etc). An aspect of the invention could use therapeutic model string fragments coupled with subject matter components and associated action components therapeutic models in synthesizing the response string structures. The response fragment strings would then contain appropriate response protocol and the responder would be left to edit in the details without fear of missing subject matter or emotive protocol. Missing subject matter in a response implies distraction and missing emotive response implies uncaring. Both are addressed.

Emotive content can be coupled to cognitive content to provide some meaningful response starters at the Thought/Action Validation stage. Here the parts of speech tokens from the sentence or word block being processed can be related to the emotive content in a fashion which will give the emotive response human like characteristics and potential insights to the responder from the "signals" the send is giving. The Thought/Action Validation model relates emotive states and emotive intensities to likelihood of action and formulates an appropriate response based on those factors.

Emotive Response Models

Many emotive response models can be implemented. A simple emotive response embodiment responds neutral, empathetic type, emotive response for a received negative emotive state. Eg. In response to a sender's "I just hate that guy . . . " one response can begin with "I can understand how you can feel hate . . . "

Some references apply positive or negative labels on emotive states but in practical fact, emotions are all positive in that they all provide information. Labels of positive or negative emotive states are based primarily on whether the emotion causes pain, negative emotion, or gives pleasure, positive emotion. Applying this to a model provides responses like "I understand that you feel EMOTIVE STATE towards NP, how can we ACTION_PHRASE?" Where ACTION_PHRASE will use some grammatically related verb phrase tokens (VP) for extracting possible action proposed by sender and reflect thanks, appreciation, agreement, support, giving, compensation, return good turn etc for pleasurable emotive states/intensities and acknowledged pain, avoidance, lessons learned, sharing similar painful memories, etc for pain causing emotive states. These strings would be concatenated into starter sting fragments or sentences and placed in the response template to give the responder insight into another level of the relationship.

In an embodiment of the invention emotive response model, pleasurable, sometimes labeled positive, received emotive state will draw a reflected similar emotive state or neutral emotive state acknowledgment. Emotive state components received which are painful, sometimes labeled negative, the emotive response model will issue an emotive state response of a neutral or consolatory nature at a numerically comparable intensity. Emotive response models can be derived from many sources like classic works, psychology, therapy techniques and even from the scriptures. This are implemented in simple input output "black box" response data structures maintained in memory data structures which facilitate storage and accessibility of mapped objects. For example, Solomon's admonition that "a soft answer repeals wrath . . . " Love for fear, compassion for greed, worry for anger, etc can be applied and implemented by a simple array which can be searched directly or by an index. A database of response model pleasurable, neutral and painful emotive states can thus be mapped to yield an output state based on some input state. An aspect of the invention provides a response model to then map the emotive state input with emotive responses, where for example a painful emotive input state would trigger the neutral or "soft" emotive response state.

A technique known as "I-Messages" is applied in an embodiment of the invention. I-messages share the responder's feelings and concerns with the sender. They are responses that communicate that the responder respects the sender's feelings but the consequences of the senders proposed behavior are affecting the responder in some fashion. The responder needs to assert that the responder is responsible for his or her own emotions and register the affect it is having on them. This response is generically in the form "When you say VERB_PHRASE SUBJECT_MATTER I feel RESPONSE_EMOTIVE_STATE because . . . . " The VERB_PHRASE and SUBJECT_MATTER are obtained from the communication as tokenized and tagged parts of speech verb phrase and related subject matter, the RESPONSE_EMOTIVE_STATE is derived from the pleasure-pain emotive response model in response to the tokenized emotive content for a particular text. The remaining work is left for the responder to edit the proposed string fragment to impart details and a conclusion. Take for example a sender's text communication snippet 910 in FIG. 9 which carries some graphical emotive content as well as cognitive content.

The communication words are tokenized and tagged in the parts of speech as:

| | |
|---|---|
| I | PRON |
| intend | Verb PRES |
| to | INFMARK |
| get | Verb INF |
| back | ADV |
| at | PREP |
| Jim | Noun |
| for | PREP |
| this | Noun DET SG |
| incident | Noun SG |
| Angry/3 | Emotive State/Intensity |

The face glyph in the communication is encoded in a known format and the decoded non-printable text associated emotive state, EMOTIVE_STATE, is Anger. This indicates that the sender is most likely in pain over some NOUN PHRASE Jim incident, and contemplates some action VERB PHRASE, intend get back at. Thus, concatenating emotive validation sentence fragment with the tokenized words, a coupled emotive-cognitive response I-message is produced:

Response: "When you say "intend to get back at Jim incident" with anger I feel worried because . . . "

Here the response string is created by coupling the concatenated I-message strings "when you say VERB_PHRASE NOUN_PHRASE with EMOTIVE_STATE I feel RESPONSE_EMOTIVE_STATE", inserted verb phrase, "intend to get back at" and noun phrase, "Jim incident" emotive state token, anger, and the emotive response from a simple emotive response model which translates painful emotive input into an appropriate responders emotion, worry. Sympathy, Empathy, or Surprise could also be substituted in the place of Worry. The resultant response would be an appropriate I-message response, which has high therapeutic value and fulfills a critical human communicative response role, which is almost always overlooked.

Fundamental Mode or Cycle of Operation

FIG. 4 is a high level flow diagram of the relationship level selection logic and commensurate response model application. A cycle begins 401 with the invocation of need of a communication response template. Selection of the communication response depth level 402 establishes which response models will be visited for contribution to the response template. Selected text 404 must be selected, demarked, highlighted or chosen so that it can be processed by sentence block or paragraph 406. The parser 408 will read the selected portion of a communication and tokenize the parts of speech and emotive content. The first stage of the cycle is runs through a Subject Matter Reflection model creating topic sentence fragments from the subject matter tokens and stored strings. If a second level of relationship depth 414 for the communication exists, a thought-action model 418 is invoked for additional sentence fragments from subjects and actions related to those subjects. A third level of relationship depth 420 branches to the emotive validation model 422 which provides response stings which recognize and validate the senders emotive state(s). A fourth level of relationship depth 424 branches to the Emotive Response model 426 which provides emotive content which would be appropriate to display to the sender in a response. As with any template, these all act as suggestions and starters but for more abstract structures, cognitive and emotive communication. The negatives to decisions 414 420 424 thread back to the next text block 406 until the entire selected communication 402 has been processed 426.

Emotive Intent Analysis

Hidden inside message complexity and ambiguity can be messages inside the emotive content signaling inappropriate behavior, relationship warnings or danger signs from a sender. An aspect of the invention is to ferret out these messages and present them to responder at a conscious level. Another embodiment performs an analysis bearing on the sender's emotional intent. In general, this is an elusive quantity at best, the implementation of which begins by establishing a sender's emotive state, emotive intensity, sender-receiver relationship and degrees of appropriateness as generally accepted by social and cultural boundaries and definitions.

An Emotive Intent analysis measures the sender's emotive reasonableness against relationship depth level for settable acceptable cultural, psychological and sociological limits. These limits define regions of 'normal' behavior as well as areas of inappropriate, potential relationship warnings, or danger sign areas. Each emotive state is represented by the emotive state's associated intensity as a function of relationship depth level. The boundaries of inappropriate and normal behavior are defined by cultural norms and psychological principles but the basic underlying principle is acceptable behavior is situational and circumstantial, a function of publisher and receiver relationship, acceptable cultural norms and psychological character and manifestation. The publisher may just be 'reaching out' unconsciously for attention or the message can contain an unconscious threat. Occasionally, in communication, there are subtle discordances, which we can detect in visual behavior and respond to locally but in textual communication these are filtered out by the text only communication. There are conscious or unconscious signals by the sender that a relationship protocol breach is occurring and the responder should take extra care in the response pertaining to that message snippet. A discordance or dissidence outside the 'normal' area triggers a corresponding notice to alert the responder with text messages or other methods at the response text location in the template so that the responder gets conscious notice that a relationship protocol breach has transpired and to take extra care in the response pertaining to that message fragment.

Figure 5:
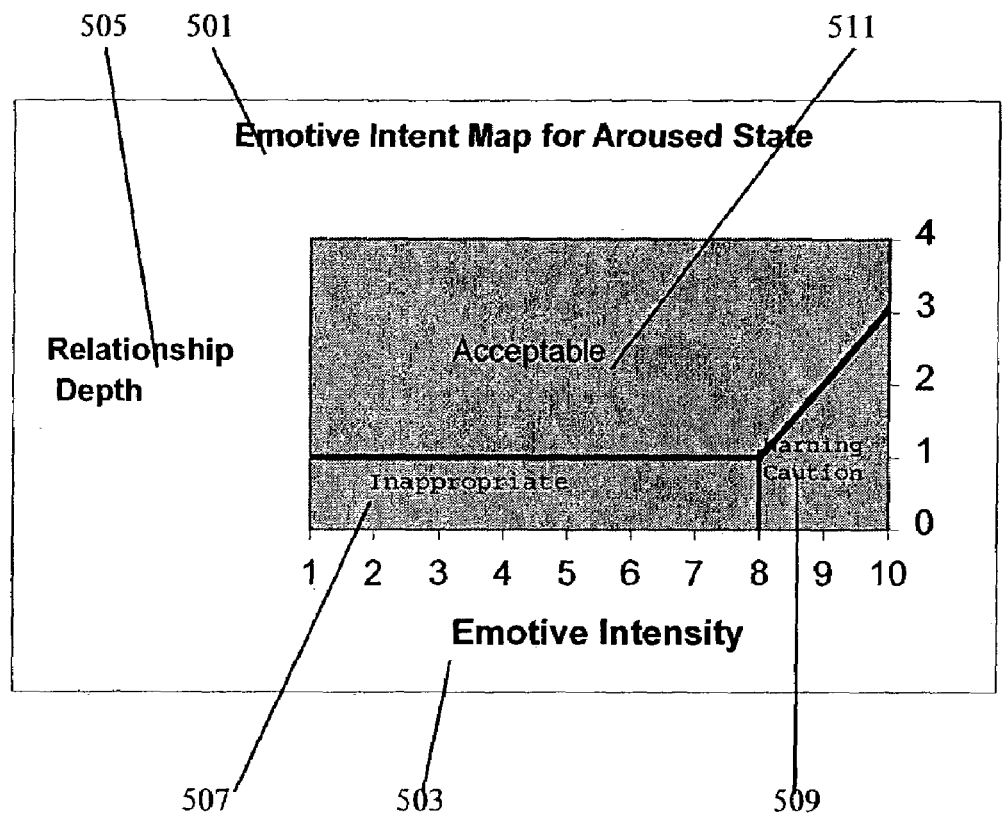
FIG. 5 illustrates an emotive intent map for the Arousal state as a function of relationship depth level and emotive intensity.
Figure 6:
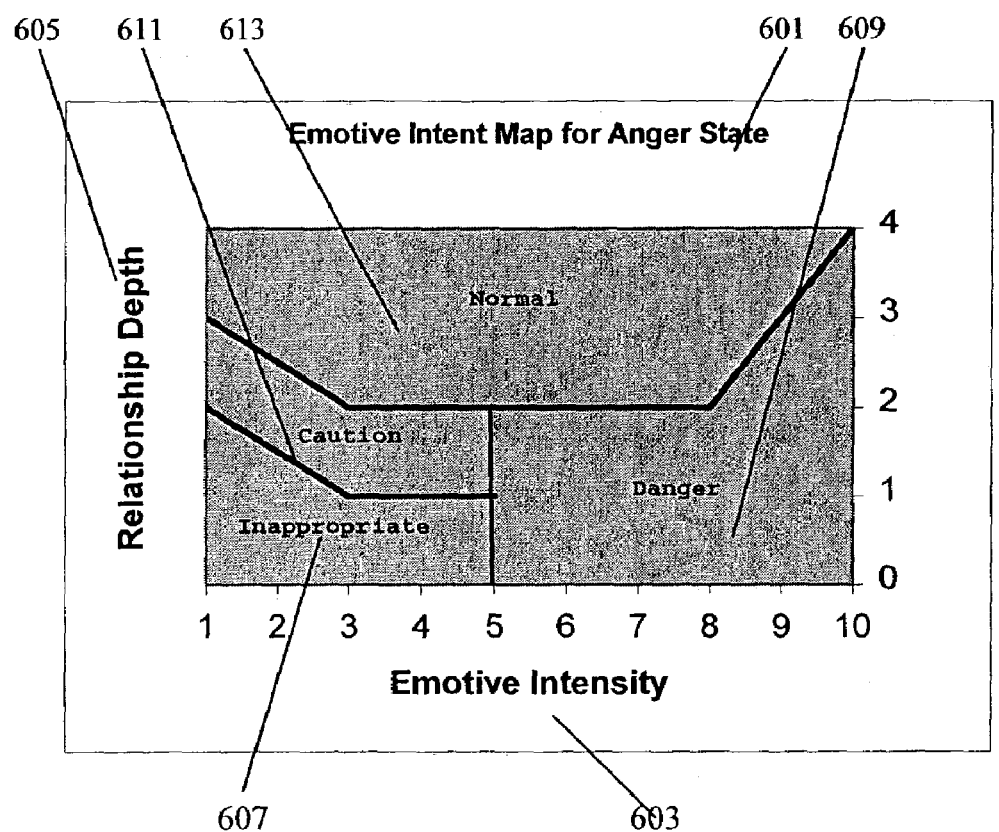
FIG. 6 illustrates an emotive intent map for the Anger state as a function of relationship depth level and emotive intensity.

Emotive Intent maps for the emotive state Arousal, is depicted in FIG. 5, and emotive state Anger, is depicted in FIG. 6. These emotive intent maps can constructed by those skilled in the art of counseling and psychology and other fields knowledgeable in human relations. These maps are indicative of generally accepted normal healthy behavior and social-cultural protocols. A simple boundary embodiment analyses seeks to find where the (emotive intensity, relationship depth) pair fall on the emotive intensity vs. relationship depth level Emotive Intent map, for each emotive state in the received communication. Warnings, inappropriate, caution and danger flags will trigger if the behavior falls in the generally not normal behavior regions. These flags will alert the responder with warning string messages to tread circumspectly and to take extra care with response to the received textual passages containing the less than normal behavior.

Those skilled in the art can create emotive Intent maps, Emotive Intensity vs. Relationship depth level, for any emotive state. Equations can be derived from the emotive intent maps for the emotive intent analysis that mathematically describe the boundaries dividing regions of normal, cautionary, inappropriate, and threatening emotive response. In one aspect of the invention, these emotive maps are implemented in routines containing the algorithms from pseudo code and used in identifying sender's emotive intent in processing the received communication. The responder is alerted to threatening, inappropriate or marginally appropriate messages either in the response template or by other user interface means.

In FIG. 5, Emotive Intent Map for Aroused State 501, the ordinate is Relationship Depth 505 ranging from 0 to 4, 1 being stranger and 4 intimate friend, partner or family member. The abscissa is the Emotive Intensity 503 ranging from 0 to 10, 0 being the slightest of feelings and 10 being the most intense feeling in a particular emotive state. As above, the emotive intensity is selected and normalized to sender/author. Based roughly on cultural, societal and psychological norms, this map is divided into regions of Normal Acceptable 511, Inappropriate 507, and Warning/Caution 509.

Representing EI=Emotive Intensity and RD=Relationship Depth,

FIG. 5 translates to psuedo code as:
Region 511 is mathematically represented in FIG. 5 as:
IF ((0<=EI<=8) AND (1<RD<=4)) OR
((08<EI<=10) AND (EI-7<RD<=4))
THEN 'Acceptable' or 'Normal'
Region 507 is mathematically represented in FIG. 5 as:
IF ((0<=EI<=8) AND (0<=RD<1)) THEN 'Inappropriate'
Region 509 is mathematically represented in FIG. 5 as:
IF ((08<EI<=10) AND (0<=RD<=4)) THEN 'Caution/Warn'

In FIG. 6, Emotive Intent Map for Anger State 601, the ordinate is Relationship Depth 605 ranging from 0 to 4, 1 being stranger and 4 intimate friend, partner or family member. The abscissa is the Emotive Intensity 603 ranging from 0 to 10, as before as the emotive intensity selected and normalized to sender, author or publisher. Based roughly on cultural, societal and psychological norms, these emotive intent maps for the base set of emotive states can be generated by those skilled in the art using the reasonable person standards of particular cultural and societal norms.

The Emotive Intent Map for ANGER in FIG. 6 is divided into regions of Normal Acceptable 613, Warning/Caution 611, Inappropriate 607 and Danger 609. With Emotive Intensity=EI and Relationship Depth=RD, FIG. 6 translates to psuedo code as:

Region 613 is mathematically represented on FIG. 6 as:
IF ((0<=EI<=3) AND ((-1/3)EI<RD<=4)) OR
((2<EI<=8) AND (2<RD<=4)) OR
((8<EI<=10) AND (IE-6<RD<=4))
THEN 'Acceptable' or 'Normal'

Region 611 is mathematically represented in FIG. 6 as:
IF ((0<=EI<=3) AND (((-1/3)EI+2)<=RD<((-1/3)EI+3))) OR ((3
<EI<=5) AND (1<RD<=2)
THEN 'Caution/Warning'
Region 607 is mathematically represented in FIG. 6 as:
IF (((0<=EI<=3) AND (0<=RD<=((-1/3)EI+2))
OR ((3<EI<=5) AND (0<=RD<=1)))
THEN 'Inappropriate'
Region 609 is mathematically represented in FIG. 6 as:
IF (((5<EI<=8) AND (2<RD<=4))
OR ((8<EI<=10) AND ((EI-6)<RD<=4)))
THEN 'Danger'

The Emotive Intent aspect of the invention adds a capability to perceive, appraise and make use of emotional knowledge.

Communication may have obscure conscious or unconscious messages. An aspect of the invention facilitates decoding of the emotive content layer making the responder clearly aware that the message intended is outside of normal parameters. For example in FIG. 9, a communication snippet 920 is received in a transmission. The emotive state is AROUSAL with intensity of 9 from a sender at relationship level of 1 point (9,1) on the Emotive Intent Map for the AROUSAL state. Although this textual statement alone is innocuous, the intensity-relationship point falls within the WARNING-CAUTION region 509 in FIG. 5 as per the pseudo code above for FIG. 5 and would trigger a receiver alert message.

Another example with the same text but different emotive content is found in the FIG. 9 snippet 930. The emotive state is ANGER with intensity of 9 from a sender at relationship level of 1. As in the example directly above, this textual statement by itself is innocuous but the intensity-relationship point (9, 1) falls within the DANGER region 609 in it's emotive state Emotive Intent map found in FIG. 6 and would also warrant receiver alert message.

The above message snippets of received communication containing angry or aroused emotive content associated with text are subjected to an Emotive Intent analysis, an aspect of the invention. The Emotive Intent analysis attempts to establish the normalcy of emotive content inferred from the totality of the variables, ie relationship, social or cultural norms and emotive state-intensity. The reader will note that the textual statement made in the above two scenarios is identical and it is the emotive content that differentiates the meaning context and also the intention of the sender.

Essentially, a two dimensional representation for a base set of emotive states are developed by those skilled in the art, obtaining emotive intensity verses relationship depth level for the set of emotive states, each demarking the regions of selected normal behavior for emotive state as a function of emotive intensity and relationship depth level, as characterized by settable acceptable cultural, psychological and sociological limits.

As shown in the above two examples, where the identified emotive intensity and relationship depth level fall on the two dimensional emotive state representation or map in a non-normal region, this raises a signal to the responder that an inappropriate or abnormal emotive signature in the emotive content has occurred.

A Cycle of Operation

FIG. 7 shows a typical received communication from Walt. This communication contains textual as well as graphical emotive content. The RELATIONSHIP DEPTH LEVEL of this communication would most likely be selected Level 1 since it is received from an acquaintance. However, for a more complete cycle of operation we will run through to a Level 4 relationship depth. An NLP tokenization of the paragraph topic sentences is shown below.

First paragraph topic sentence

| WORD | PART OF SPEECH |
|---|---|
| I | PRON |
| know | VERB PRESENT TENSE |
| that | CS |
| you | PRON |
| 've | VERB PRESENT TENSE |
| heard | VERB PAST TENSE |
| me | PRON |
| talk | VERB INFINITIVE |
| about | PREP |
| our | PRON |
| Saturday | NOUN N SG |
| Evening | NOUN N SG |
| Book | NOUN NSG |
| Club | NOUN |
| and | CC Coord Conjunction |
| how | ADV |
| much | ADV ABS |
| I | PRON |
| enjoy | VERB PRES |
| it | PRON |

Second paragraph topic sentence

| Jim | NOUN |
|---|---|
| please | ADVERB |
| consider | VERB IMP |
| this | DET |
| letter | NOUN |
| a | DET |
| formal | A ABS |
| invitation | NOUN |
| to | PREPOSITION |
| our | PRON |
| next | DET |
| meeting | ING |
| Saturday | NOUN |
| evening | NOUN |
| the | DET |
| 6th | NUM ORD |
| at | PREPOSITION |
| 7:00 | NOUN |

Third paragraph topic sentence

| Please | ADVERB |
|---|---|
| give | VERB IMP |
| me | PRON |
| a | DET |
| call | NOUN |
| by | PREP |
| Tuesday | NOUN |
| evening | NOUN |
| to | INFMARK |
| let | VERB INF |
| me | PRON |
| know | VERB INF |
| if | CS |

| -continued | |
|---|---|
| you | PRON |
| would | VERB AUXMOD |
| like | VERB INF |
| to | INFMARK |
| attend | VERB INF |
| or | Coord Conjunction |
| if | CS |
| you | PRON |
| have | VERB PRES |
| any | NOUN DET |
| questions | NOUN |

NLPs identify grammatical roles of words and extract semantic content of different types, which are shown above. In one embodiment, the noun phrases are concatenated with appropriate grammatically tailored (correct tense, conjugation etc stored strings, to develop template topic sentence starting structures for the different depth level response models. An aspect of the invention is to allow the user to edit in the details without omitting anything of import in error, cognitive or emotive. Below are automated responses sentence fragments formulated by aspects of the invention described for the paragraphs 1 through 3 using the subject matter stored strings connectors and the subject matter from tokenized noun phrases extracted from the paragraph topic sentence where:

SMSS=Subject Matter Stored Stings

NPx=Noun Phrase for xth noun

EVSS=Emotive Validation Stored String

ETy=Emotive Token for yth emotive state

The Subject Matter stored string connectors and noun phrase tokens are identified by label directly below each concatenated response fragment and token. In other embodiments, the noun phrase as well as related adjective descriptor can be applied as well.

Subject Matter Reflection Response Sentence Fragments for paragraphs 1 through 3 are:

You wrote me about [Saturday Evening Book Club, small group, way,

SMSS1 NP1 NP2 NP3 NP4 opportunity, new member].

NP5 NP6

Concerning [Jim, letter, formal invitation, next meeting]

SMSS2 NP1 NP2 NP3 NP4

I can appreciate that [call, Tuesday evening] is on your mind and

SMSS3 NP1 NP2 SMSS3

The paragraph 3 stored string fragment comes with a "slot" between where the noun phrase is placed. As shown above, stored sentence fragments may have more than one "slot" to accommodate the various parts of speech components which are concatenated with generic connective grammatical strings stored as Subject Matter, Thought-action, Emotive Validation and Emotive Response pre-stored string fragments. These stored fragments carry much human communication technology and applied as dictated by relationship level.

Emotive Validation Implementation

Applying the I-messages, the emotive validation stored strings (EVSS) concatenated with the emotive tokens for the paragraphs 1 through 3 are:

It seems that you [enjoy, like, happy] regarding [Saturday
EVSS1 ET1 ET2 ET3 EVSS1
Evening Book Club]
NP1
As you [like] [letter, invitation, Saturday]
EVSS2 ET1 NP1 NP2 NP3
Looks as if you feel [wonderful] about [Tuesday evening member]
EVSS3 ET1 EVSS3 NP1 NP2 NP3

Emotive Response

Figure 10:
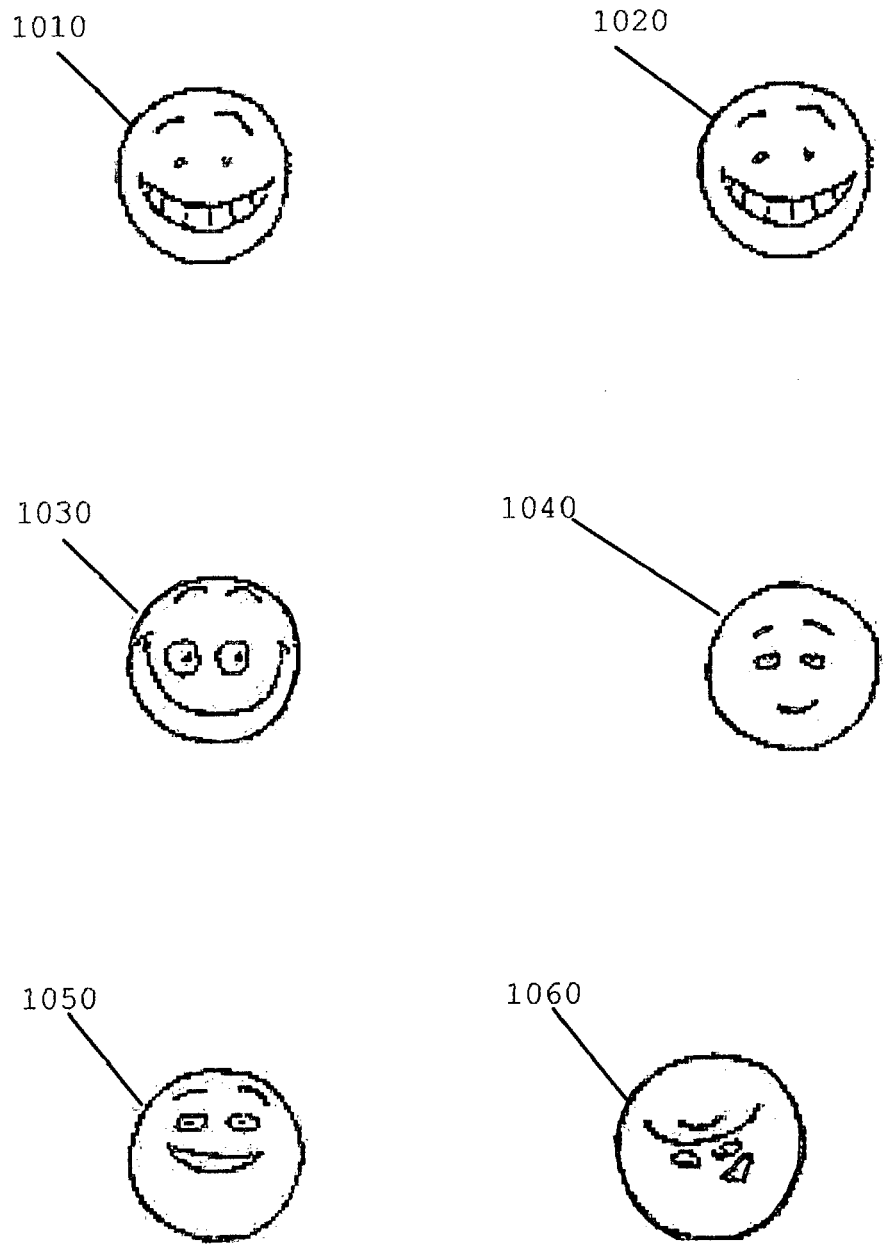
FIG. 10 illustrates aspects of an emotive response model as applied to example communication.

The graphical emotive content state-intensity pairs tokenized for FIG. 7 communication per paragraph are; Happy/3, Interested/3, Optimistic/3. These are all positive or pleasurable sender emotive states. A simple embodiment of the invention emotive response aspect would respond with same or similar positive or neutral emotive responses of comparable emotive intensities. Below right hand column are the FIG. 8 emotive responses to the emotive content in the FIG. 7 graphical emotive states received communication per paragraph. FIG. 9 displays the response model inputs and outputs for the communication in FIG. 7 and response template FIG. 8. Face glyphs Happy 1010, Interested 1030, and Optimistic 1050 on FIG. 10 are the received emotive content in FIG. 7 for paragraphs 1,2 and 3 respectively. The corresponding emotive response face glyphs Happy 1020, Thoughtful 1040, and Concentrating 1060 of FIG. 10 are shown directly adjacent to their corresponding emotive state. The emotive state graphic in paragraph 1 was Happy 1010 at an emotive intensity of 3. Since this is a pleasurable (positive) emotive state, the emotive response model will tend to reflect the same or similar pleasurable emotive response of Happy 1020, along the lines of sharing the joy. The communication FIG. 7 second paragraph contained the graphical emotive state Interested shown 1030 in FIG. 9. This is a somewhat neutral emotive state which naturally provokes thoughtful emotive state and hence the emotive response of Thoughtful 1040 with a matching emotive intensity of 3. The third paragraph in FIG. 7 carries a graphical emotive state Optimistic 1050, which is also somewhat pleasurable but mostly neutral emotive state. This state implies waiting and anticipation which invokes a neutral response graphical emotive state Concentration 1060 in FIG. 10 The emotive response to the communication in accordance with an embodiment of the instant invention would be emotive state/intensity of Happy/3, Thoughtful/3, Concentrating/3 per paragraphs 1, 2 and 3 respectively. These are shown in FIG. 8 response template file.

The resultant response template is shown in FIG. 8 and the above emotive responses would be embedded in the template file as suggestions. The template would also contain proper salutations and endings, freeing the user to fill in preferably program unknowable details. This editable template will typically be incomplete and editable by the responder. However, the template is subject matter comprehensive, contains "heard" and "felt" response starters and a possible emotive response, all the personal boiler plate that typically falls through the cracks of human communication. An emotive response embodiment of the invention will provide response emotive states and associated author normalized emotive intensities for writing to template file or output device such as a display or network device.

A more complex emotive response model would include the interaction of emotive content with subject matter and associated action words. A knowledge base or even database containing relationships among emotive state, subject matter and associated actions could be used in an emotive response model to establish more specific emotive responses. More proximate and better inferences can also me made as to meaning of particular communication text and associated emotive content. This analysis would constitute appraising the identified emotive content through an emotive response model with selected input and pre-set outputs, a knowledge base for similar subject matter and action components which can be searched for patterns or signatures of similar occurrences and programmed responses to those signatures.

OTHER EMBODIMENTS OF THE INVENTION

While the invention has been described with reference to a preferred embodiment in which the emotive content is parsed for the purposes of aiding a receiver to draft a response communication, another embodiment of the invention may be carried out in a different manner. Applications using emotive parsers to establish emotive content profiles of senders, sender's emotive pattern signatures or personality profiles or to establish emotive distributions to stimuli such as collective feelings regarding target issues are alternate application embodiments. Aspects of the invention can be extended to testing sent messages for specific responses, emotive and cognitive. In fact, the invention is not confined to any particular application of emotive parsing. The invention is not confined to a particular psychological theory such as Rogerian therapy but may rest on Jung's theory on the collective unconscious or statistical models such as form the basis for the MMPI, alternate therapy methods such as, Gestalt, active listening, etc. The present invention is also not isolated to a single computer system. It is directed to electronic communication such as via the World Wide Web or through communications systems. This invention can be implemented in the use of wireless applications, interactive commerce and display environments.

Because of the high emotive precision of normalized emotive content, any range maybe selected and we only show examples of ranges from 1 to 10. However, the emotive parsers are especially suited for many other communication applications. Aspects of the invention facilitate expression and transmission of precise emotive content, which can facilitate other textual communication applications for example sending emotive content by cell phone to a friend indicating perhaps nothing more than an exact feeling which would have some significance to the receiver.

While the invention has been described in detail with reference to preferred embodiments, various modifications to the preferred embodiment will be readily apparent to those skilled in the art. The general principles defined herein may be applied to other embodiments and applications without departing from the spirit or scope of the invention. Thus, the present invention is not intended to be limited to the embodiments shown, but is to be accorded the widest scope consistent with the principles and features disclosed herein. In general, embodiments of the invention relate to methods, systems and articles for processing and responding to electronic communication with embedded emotive content.

What is claimed is:

1. A method of creating custom specific message text and emotive content response templates for communications in textual applications executing on a computing device comprising:
   parsing, tokenizing and tagging of a received communication into parts of speech components by a natural language parser;
   parsing and tokenizing emotive content of the received communication into emotive states and associated intensity;
   programmatically selecting subject matter components from the set of communication tagged parts of speech components;
   fetching starter sentence string fragments from a plurality of pre-stored set of alternate starter sentence strings;
   synthesizing grammatical subject matter response sentence fragment strings by concatenating the fragment strings with the selected subject matter components;
   synthesizing reflective emotive response in the form of emotive text from the received emotive states and associated intensity tokens; and
   opening a response file or output device into which synthesized starter subject matter response sentence string fragments and reflective emotive response are written,
such that the application can systematically process the received textual communication and synthesize communication unique emotively tailored comprehensive subject matter communication response templates populated with response sentence string fragments.

2. A method as in claim 1 further comprising;
   programmatically selecting subject matter components and action components from the received communication tagged parts of speech components; and
   fetching thought-action starter sentence string fragments from a plurality of pre-stored alternate thought-action starter sentence strings; and
   synthesizing grammatical starter thought-action response sentence fragment strings by concatenating the thought-action fragment strings with selected subject matter and action components; and
   writing synthesized starter thought-action string fragments into the response template file or output device.

3. A method as in claim 1 further comprising;
   programmatically selecting emotive state components from the communication tagged components identified as emotive state words from a set of pre-defined feeling words; and
   fetching stored starter sentence emotive validation string fragments from a plurality of pre-stored alternate emotive validation starter sentence strings; and
   synthesizing grammatical starter emotive response sentence fragment strings by concatenating the emotive validation fragment strings with selected emotive state components; and
   writing synthesized starter emotive response string fragments into the response template file or output device.

4. A method as in claim 1 further comprising:
   parsing communication and identifying encoded graphical emotive content; and
   mapping identified graphical emotive content to response graphical emotive state and associated author normalized emotive intensity; and
   writing mapped emotive states and associated author normalized emotive intensities to response template file or output device.

5. A method as in claim 1 further obtaining a stripped set of identified component words by comparing identified word components to their dictionary or thesaurus alternates and eliminating component words with alternates common to any other identified component words.

6. A method as in claim 4 further implementing an emotive response model by mapping the tokenized emotive state to an neutral or pleasurable response emotive state if the tokenized emotive state is a painful emotive state and reflecting the same emotive state if the tokenized emotive state is pleasurable emotive state, keeping the associated emotive intensity of the response emotive state invariant.

7. The method in claim 1 further predicating sentence string fragment synthesis on associated reflective, validative or emotive response models relative to author-receiver relationship depth level.

8. A method of claim 1 further comprising communications created by applications from a group consisting essentially of word processors, email, messaging, publishing software, handheld communication and text capable cell phones executing on a networked computing device.

9. A method of creating custom tailored message text and emotive content response templates for communications in text display computer application programs executing on a computing device comprising:
   parsing, tokenizing and tagging the communication parts of speech components; and
   filtering the communication subject matter components to produce a minimum set of non-redundant subject matter components; and
   fetching thought-action starter sentence string fragments from pre-stored data structures containing alternate thought-action starter sentence strings; and
   synthesizing grammatical starter thought-action response string fragments by concatenating the fetched thoughaction string fragments with filtered subject matter and associated action components; and
   writing synthesized starter thought-action string response fragments into the response template file or output device.
   identifying the communication emotive content through a selectable emotive response model and a subject matter knowledge base; and
   mapping communication identified emotive states and associated emotive intensities to pre-designated response emotive states with similar emotive intensities in accordance with an emotive response model; and
   synthesizing grammatical response sentences strings by concatenating strings of stored emotive response sentence fragments with non-redundant set of subject matter and action word communication parts of speech components and the mapped emotive state-intensity response components; and
   writing synthesized response strings and emotive response components to response template or output device;
such that the synthesized starter response string fragments written to response template file reflect communication message subject matter, validated emotive state and textual and graphical emotive response components relative to the selected sender-receiver relationship depth level.

10. A computer program residing on a computer-readable media, said computer program creating custom specific message text and emotive content response templates for communications in textual applications executing on a computing device comprising:

parsing, tokenizing and tagging of a received communication into parts of speech components;

parsing and tokenizing emotive content of the received communication into emotive states and associated intensity;

programmatically selecting subject matter components from the set of communication tagged parts of speech components;

fetching subject matter starter sentence string fragments from a plurality of pre-stored set of alternate subject matter starter sentence strings;

synthesizing grammatical subject matter response sentence fragment strings by concatenating the fragment strings with the selected subject matter components; and synthesizing reflective emotive response in the form of emotive text from the received from the emotive states and associated intensity; and opening a response file or output device into which synthesized starter subject matter response sentence string fragments and reflective emotive response are written;

such that the application can systematically process the textual communication and synthesize specific emotively tailored communication response templates populated with response sentence string fragments.

11. A computer network supporting computer application functions facilitating express communications comprising:

a plurality of computing devices connected to a computer network;

one or more display devices connected to each of said plurality of computing devices;

at least one received communication expressing emotive content through emotive state and author normalized emotive intensity associated with textual communication; and at least two computing device applications exchanging textual communication and associated emotive content; and communication receiver application parsing, tokenizing and tagging textual communication parts of speech; and communication receiver application parsing textual communication and tokenizing associated emotive content;

communication receiver application programmably synthesizing a response template with cognitive and emotive components of textual communications; and communication receiver application displaying communication of textual and associated response emotive content on said computing display device.

* * * * *